(12) United States Patent
Srinivasan et al.

(10) Patent No.: US 7,392,162 B1
(45) Date of Patent: Jun. 24, 2008

(54) SYSTEM AND METHOD FOR DEVICE DEVELOPING MODEL NETWORKS PURELY BY MODELLING AS META-DATA IN A SOFTWARE APPLICATION

(75) Inventors: Venkatesan Srinivasan, Weston, MA (US); Mahantesh Kothiwale, Mansfield, MA (US); Rummana Alam, Walpole, MA (US); Srinivasan Bharadwaj, Sharon, MA (US)

(73) Assignee: Rage Frameworks, Inc., Westwood, MA (US)

( * ) Notice: Subject to any disclaimer, the term of this patent is extended or adjusted under 35 U.S.C. 154(b) by 966 days.

(21) Appl. No.: 10/704,471

(22) Filed: Nov. 7, 2003

Related U.S. Application Data

(60) Provisional application No. 60/435,333, filed on Dec. 20, 2002.

(51) Int. Cl.
*G06F 17/50* (2006.01)
*G06F 17/11* (2006.01)
*G06F 9/44* (2006.01)

(52) U.S. Cl. .............................. 703/2; 703/22; 717/105; 345/473; 706/50

(58) Field of Classification Search .................... 703/2, 703/22, 17; 717/105, 109; 706/47, 60, 50; 345/473
See application file for complete search history.

(56) References Cited

U.S. PATENT DOCUMENTS

| 6,173,276 | B1 | 1/2001 | Kant et al. | |
| 7,027,055 | B2 * | 4/2006 | Anderson et al. | 345/473 |
| 2002/0078433 | A1 * | 6/2002 | Rajarajan et al. | 717/105 |
| 2006/0015847 | A1 * | 1/2006 | Carroll, Jr. | 717/109 |
| 2007/0162373 | A1 * | 7/2007 | Kongtcheu | 705/36 R |

* cited by examiner

*Primary Examiner*—Thai Phan
(74) *Attorney, Agent, or Firm*—William L. Botjer

(57) ABSTRACT

A system, method and computer program that enables an application designer to automate the process of development of computational logic based applications. The designer develops the computational logic based applications by modeling. The process of development of applications by modeling does not require any coding. The modeling activity is accomplished by using the visual modeling environment, which among other tools comprises a set of pre-built reusable components. Each component represents a dimension of functionality that is commonly required in software applications. The designer specifies application-specific context for the components. Components when provided with application specific context become tasks. The tasks are then connected together in a logical order to develop an application. The applications thus developed are then visually verified. These applications are then executed by a Model Network Engine.

23 Claims, 22 Drawing Sheets

SYSTEM AND METHOD FOR DEVICE DEVELOPING MODEL NETWORKS PURELY BY MODELLING AS META-DATA IN A SOFTWARE APPLICATION

RELATED APPLICATIONS

This application claims priority to U.S. Provisional Patent Application No. 60/435,333 entitled "A system and method for developing model networks purely by modelling as meta data in software application" by Dr. Venkatesan Srinivasan, Mahantesh Kothiwale, Rummana Alam and Srinivasan Bharadwaj, filed on Dec. 20, 2002.

BACKGROUND

The present invention relates to the field of developing software applications that involve mathematical computations.

Many industries such as financial services, insurance, utilities, energy, research, industrials, etc. involve the use of mathematical computations in their operational activities. Applications that support these activities, therefore, need to support computational logic to perform these functions. Computational logic can be defined as a network of computational models linked in a logical manner. Here, a computational model signifies a mathematical expression.

In many instances, these computations need to be performed real-time to respond to a request from a prospect, for example, when a prospect requests a quote for insurance and thus requires that the computations be performed in a quick and efficient manner. Another example is when a potential customer applies for a credit card on a web site. Real time execution of requests of a large number of users (from a large number of access locations) is a challenging task. Simulation and solution of these real world problems require highly complex coding. Typically these applications are developed to cater to the specific needs like—credit assessment, insurance premiums, investment rating, market research, sales and operations. In some cases, these computational models represent the core of the company's offering. Therefore the speed with which new products can be introduced is largely dependent on the speed with which the required computational models can be implemented. This implies the need for flexibility in the way these models are implemented.

The conventional way to incorporate these computational models in applications comprises two stages. The first stage involves generation of a model and the second stage involves implementation of the generated model to carry out computations. The generation of models involves using a statistical or judgmental methodology to discern a pattern that best explains and predicts a phenomenon. For example, parametric statistical models like regression models are developed using statistical applications such as SAS based on a set of sample data. After the model is developed, the regression model is implemented to carry out the planned computations. The implementation stage involves implementing the regression model created in the generation stage. Implementation of the regression model includes creating a software application that is used in day-to-day operations to perform the computations.

A typical way of implementing these computational model based applications is to code the regression models. A conventional way to code the regression models is to go through a conventional software development lifecycle (SDLC) whether through a code generator or otherwise. The SDLC is illustrated in FIG. 1. As shown in FIG. 1, the Software Development life Cycle (SDLC) consists of various stages as an idea gets converted into a software application. At each stage, output from the previous stage is translated to serve the purpose of the current stage. In such a cycle, in most cases, unless one stage of the cycle is complete, next stage cannot be started. Also, with each translation, substantial effort is required to preserve full information and knowledge from the previous stage. Thus, a significant amount of overhead is created at each stage. As a result, traditional SDLC based development of software applications is cumbersome and time consuming.

Yet another problem faced with the code developed in the traditional manner is debugging. It is very expensive and time consuming to trace errors in a code that implements complex logic applications. Also, testing the code on the system incrementally is not possible in some cases. Testing the code is possible only when the entire code has been written. Such a limitation could make the code worthless after it is completely developed.

To overcome the abovementioned drawbacks, substantial efforts have been directed in making the SDLC effective, fast and predictable. These efforts can be classified in two broad categories—methodological approaches and automation approaches. The methodological approaches are aimed at improving the communication and translation between various stages of the lifecycle by standardizing them and reducing the redundancies across application development efforts. The automation approaches are aimed at automating one or more stages of the cycle.

The automation approaches are directed towards automating code generation and testing. Testing tools can reduce the physical testing efforts significantly. However, these tools are based on the creation of test cases. Thus, testing by these tools is a tedious and time-consuming task. Also, these testing tools are focused on reducing the effort in testing instead of eliminating the need for testing.

In the 1980s, efforts directed towards automated code generation and testing tools resulted in the emergence of Computer Aided Systems Engineering (CASE) tools. However, these tools were not successful as they were based on weak conceptual models.

Though application development technology has advanced considerably in terms of methodological approaches and automation approaches, it still faces a number of fundamental issues. These issues are related to time to market, availability of skilled resources, rapid changes in technology environments and heterogeneity.

Time to market is one of the most important issues. Earlier, it was common to put years in developing applications. However, such durations have now become unacceptable and put organizations at a serious disadvantage. The second issue with application development is the unavailability of trained resources (people). There is a general shortage of adequately trained resources and this greatly contributes to the delays and failures in application development. Moreover, development of computational model based applications requires special skill sets. In addition to knowledge of software programming, programmers are required to have skills related to mathematical models. Compounding this issue is the rapid obsolescence of skill sets with newer technologies. For example, a few years ago, C++ programmers were sought after and now they have to retool to be Java programmers. The third issue with application development relates to the heterogeneity of technologies. In the last two decades, there has been a dramatic increase in the rate at which new products and technologies have been introduced. This dramatic increase in new technologies has led to an increased heterogeneity. The heterogeneity in technology infrastructure is often a major issue in most corporations and often influences their purchasing decision in favor of one technology over another. Organizations have to balance a unified infrastructure with availability of the desired functionality on that infrastructure. The fourth issue with application development relates to modifying and scaling an installed computational model based application. Once an application is developed and installed, modifying the application is a complex task that requires a considerable amount of trained resources.

In addition to the abovementioned issues, there is another major issue that application development technologies have not addressed. Most approaches to application development are functionally oriented. Process, often thought of as workflow, is mistakenly viewed as distinct and separate from functions or tasks. For example, a computational model based application is viewed as a collection of distinct mathematical functions.

The abovementioned issues make the development of computational model based applications a tedious, expensive and time-consuming task.

The prior art products and patents mentioned below attempt to solve some of the problems, encountered in the traditional way of developing applications that implement computational logic.

One such product line is G_MATH and G_FFT for Delphi by Sigma Softwares located in Maryland, United States. G_MATH helps in creating interactive mathematical, financial, and scientific applications using pre-designed and crafted functions. G_FFT allows one to perform Fast Fourier Transform (FFT) and Inverse Fast Fourier Transform (IFFT). The user provides a problem description for a mathematical expression to the system in detail. The system includes an expression evaluator that supports variables and parameters. The expression evaluator assists in the execution of expressions.

Another product is Tau Generation2 Tools by Telelogic located in California, United States. Telelogic Tau Generation2 is a family of software development and testing tools. These tools support the software development lifecycle that includes system analysis, specification to real-time software design, implementation and testing. A model-driven software development is used in these tools. Tau Generation2 provides a visual modeling environment that allows engineers to specify system architecture, design and behavior using the industry standard visual development language, UML 2.0. System specifications and designs to be modeled are analyzed and verified at early stages of the SDLC.

U.S. Pat. No. 6,173,276, titled, "System And Method For Financial Instrument Modeling And Valuation" deals with similar issues. This patent is assigned to Scicomp, Inc. located in Texas, United States. This patent discloses a system and a method for application development for mathematical computations. The user provides a concise mathematical description of the problem to be solved in a problem specification language. The mathematical problem could involve a single mathematical expression or a complex combination of many mathematical expressions. Once the problem has been defined, a pseudo code is automatically generated by the system. Further, from the pseudo code a source code is automatically generated. This source code forms the entire software application for a mathematical problem.

All the patents and products mentioned above require the software developer to do some coding or involve the generation of code. They either require the application developer to write the code or they generate the code in specific language(s) using models that are created by the application developer. Models are created by the application developer in a specific language. None of these patents or products incorporates support for computational logic in applications without any code generation. Since, the end product is a code in a programming language, these environments still require substantial amount of programming skills and ongoing maintenance. In addition, any modification in a developed application requires a significant amount of time. Moreover, these solutions do not provide an easy means to visualize the logic and avoid the time and effort needed to internalize computational logic from the code. Also, these patents and products trace through the SDLC step by step to develop an application. As a result, these patents and products take a long time to develop applications.

Hence, there is a need for a system and method that addresses all the abovementioned issues.

SUMMARY

The present invention is directed to a system, a method and a computer program that provide an application development framework that automates the process of development of computational logic based software rather than automating the process of coding.

An object of the present invention is to provide a system, a method and a computer program that enable an application designer to develop applications based on computational logic by modeling.

Another object of the present invention is to provide a system, a method and a computer program that enable an application designer to develop applications based on computational logic with reduced software development life cycles.

A further object of the present invention is to provide a system, a method and a computer program that reduce an application development activity to a pure modeling exercise.

Another object of the present invention is to provide a system, a method and a computer program that allow changes to be made rapidly in applications by merely changing the application models without doing any re-coding or code-testing as in a conventional software development life cycle.

Another object of the present invention is to provide a system, a method and a computer program that is user friendly and reduces and/or eliminates the need for an application designer to have expertise in at least one formal programming language.

To attain the above-mentioned objectives, the present invention provides a system, a method and a computer program that provide a complete application development environment for computational models. The application development environment comprises a visual modeling environment enabling an application designer to design and model applications, a set of reusable pre-built components, a model network engine capable of executing the applications, a database and/or applications modeled by the application designer. The visual modeling environment allows the application designer to develop application models in a flowchart like manner using pre-built reusable components. These reusable components are highly abstract objects that are built to perform a specific function in computation. The designer creates computational logic based applications by selecting appropriate components, specifying application specific meta-data to model tasks using selected components and then logically connecting them with each other. The components are reusable, i.e. once a component is selected, a copy of that component is created for use in an application. Thus, a component can be used in different applications by creating copies of the component and specifying meta-data as per the application's properties. After selecting the required components, the designer inputs application-specific data. The application specific data provided to a component is called meta-data.

For example, for a Model component, a component that represents a mathematical computation, a formula and used variables form the meta-data. A component instance when provided with application specific data becomes a task. The tasks thus generated are then connected together in a logical manner to create applications. The model network engine executes the application models i.e. runs the applications developed using the visual modeling environment. The application models generated can also be executed by third party systems. That is, the system according to the present invention has the capability of integrating with third party systems. Thus, the applications generated by the system can also be executed through third party systems. Third party systems execute the application models by inputting a request to model network engine.

BRIEF DESCRIPTION OF THE DRAWINGS

The preferred embodiments of the invention will hereinafter be described in conjunction with the appended drawings provided to illustrate and not to limit the invention, wherein like designations denote like elements, and in which.

DESCRIPTION OF PREFERRED EMBODIMENTS

Figure 1:
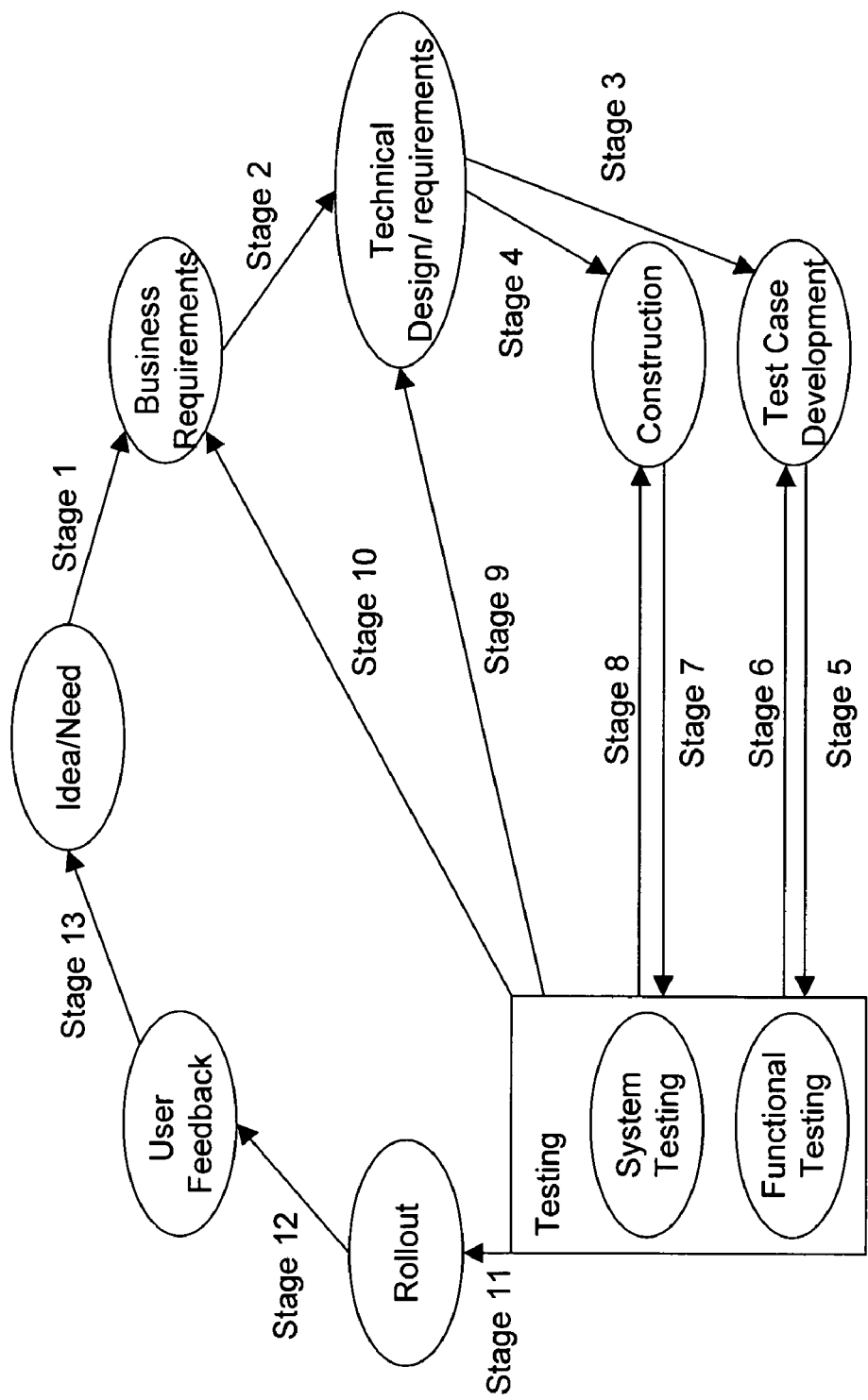
FIG. 1 shows a conventional Software Development Life Cycle (SDLC)
Figure 2:
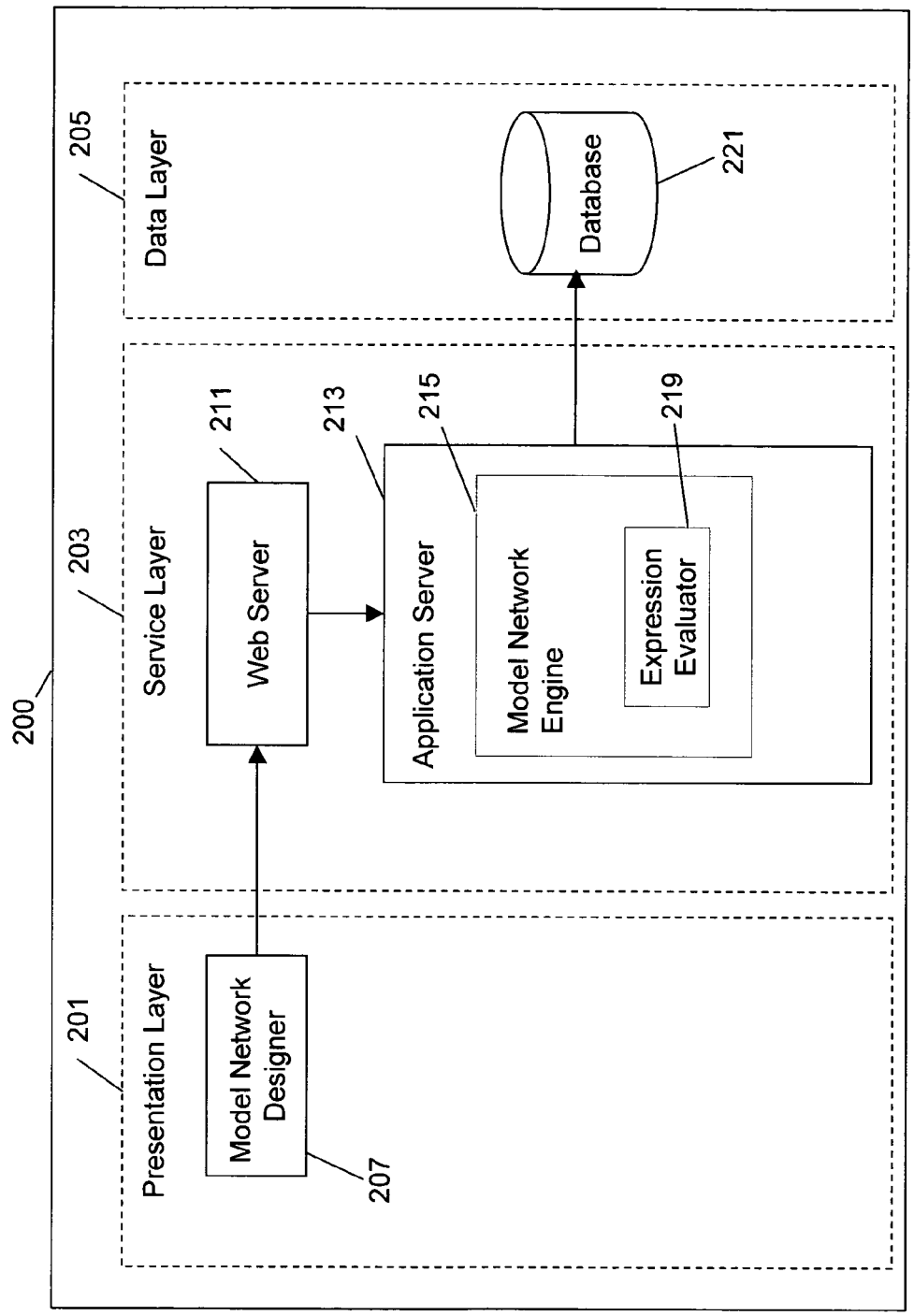
FIG. 2 is a network diagram of the system in accordance with a preferred embodiment of the present invention.

A network diagram of the system in accordance with a preferred embodiment of the present invention is shown in FIG. 2. System 200 allows for development and deployment of a set of interrelated computational models, using meta-data but without any programming or coding. "Meta-data" is defined as a collection of application specific parameters, such as the expressions to be evaluated and variables to be used in the expressions parameters. A set of interrelated computational models is hereinafter referred to as a Model Network. A computational model, hereinafter referred to as a Model, is a mathematical expression—a simple example of which would be y=mx+c. A Model Network is created using reusable pre-built components. An example of a pre-built component is a Model. A pre-built component when supplied with meta-data becomes a task. A task represents a function in the application (Model Network). Tasks are connected together in a logical manner to create an application. For example, consider a situation where a user wants to develop the following Model Network:

| | |
|---|---|
| $a=(b \times c)+d$ if c>100 | Expression 1 |
| $a=(b+c) \times d$ if c<100 | Expression 2 |
| Where, | |
| $b=(c/y)+(d \times z)$; and | Expression 3 |
| $c=(m+n) \times p$. | Expression 4 |

Here, the Model Network to be developed requires defining the abovementioned three computational models that are related to each other. Here, the user first defines a computational model for Expression 3 using the Model component. Expression 3, $c=(m+n) \times p$, is provided to the Model component as meta-data. In addition to the expression, the values of the variables (and the memory location from where the values can be obtained) are provided as meta-data. On providing the meta-data to the Model component, the Model component becomes a task. This task represents the function of performing the computation of Expression 3. After developing this task, the user develops a Model Network corresponding to Expression 2. Here, the user uses a pre-built component called Model Network. Here, the user provides Expression 2 and variable values as meta-data. To provide the value of variable 'c', the user uses the output of the task defined for Expression 3. Thus, a new task representing Expression 2 is developed. Similarly a task corresponding to Expression 1 is developed. This task is developed using the tasks developed for Expression 2 and Expression 3. In this manner, the application that is based on interrelated computational models is developed only by providing meta-data to the pre-built components.

The network architecture in accordance with the present invention supports three layers—a Presentation Layer 201, a Service Layer 203 and a Data Layer 205.

Presentation Layer 201 comprises a user interface called Model Network Designer 207. Model Network Designer 207 is a Java application used to create, debug and validate Model Networks. Model Network Designer 207 provides a visual modeling environment to a designer. Using Model Network Designer 207, the designer creates a Model Network by specifying meta-data. In addition to Model Network Designer 207, Presentation Layer 201 comprises a plurality of clients (not shown in FIG. 2) to enable a user input a request for execution of a Model Network. These clients are third party systems that are integrated with System 200. This integration allows third party systems to execute Model Networks developed using System 200.

Service Layer 203 comprises a Web Server 211 and an Application Server 213. Web Server 211 connects Model Network Designer 207 and other clients to Application Server 213. Hence, any request from Model Network Designer 207 and other clients (third party systems) is sent to Application Server 213 through Web Server 211. Model Network Designer 207 interacts with Web Server 211 through HTTP(S) (Secure Hyper-Text Transfer Protocol).

Application Server 213 comprises a Model Network Engine 215. Model Network Engine 215 is the runtime execution module of System 200. Model Network Engine 215 serves (i.e. executes or interprets) the requests generated by an application designer while developing and maintaining application models and serves the requests generated by a user while using an application. Model Network Engine 215 also houses XML versions of the processes and the tasks defined using Model Network Designer 207. While processing a request for a Model Network, Model Network Engine 215 identifies the Models that form the Model Network. As discussed earlier, each Model comprises a mathematical expression. To evaluate expressions, Model Network Engine 215 comprises an Expression Evaluator 219. Expression Evaluator 219 is a component that has the capability of computing mathematical expressions. Thus, Model Network Engine 215 eventually evaluates every Model Network, Model or Rule using Expression Evaluator 219. A Rule is a reusable component that defines a conditional relationship to be verified.

Data Layer 205 comprises a Database 221. Information relating to the execution of the designer's request and a user's requests is logged in Database 221. Database 221 stores meta-data related to every Model Network.

The pre-built components used to develop Model Networks are of two types—Functional components and Flow components. These components are reusable. Functional components allow the designer to model a function using logic. Functional components include Model Network, Model, Rule and Decision Tree (DT). Flow components allow the application designer to model aspects of the process flow. Flow components include Selector, Line, Text, Message Task and Task.

Each component represents a dimension of functionality that is commonly required in a Model Network. All components are designed such that the functionality embodied in the component is externalized in the form of meta-data.

Each component has a similar structure and comprises three sub-parts. The first sub-part is a meta-data structure. Meta-data is defined as a collection of application specific parameters. A component when provided with meta-data becomes a task. A task represents a function specific to the application. The second sub-part of a component is a set of Graphical User Interface (GUI) objects. These GUI objects encapsulate the meta-data structure and provide a user-friendly environment for the application designer to specify the meta-data. The third sub-part is a code segment that understands the meta-data structure and the implied functionality of the component. The code segment uses the meta-data and the abstract function of the component to perform a computation specific task.

The concept of meta-data structure is illustrated with reference to an example of a Model component. The Model component is used in a business process that requires the following computation:

$$R=(P2 \times C)/(P1 \times (N \times P))$$

where,

R=average revenue per sale;

C=Credit line;

N=# of orders in a given period;

P=profit margin for the average order;

P1=profitability of payment; and

P2=(1−P1).

This formula is provided as meta-data to the Model component. The Model component has the capability of accepting computational expressions as meta-data and evaluating them. The variables used in the formula may be provided by the designer, may have been already created in a previous task or may be accessed from Database 221.

When there is a request for execution of a Model Network, meta-data for that Model Network is accessed by Application Server 213. Expression Evaluator 219 associates the meta-data with the code segment sub-part of the Model Network component. Thereafter, the user's request is executed.

Figure 3:
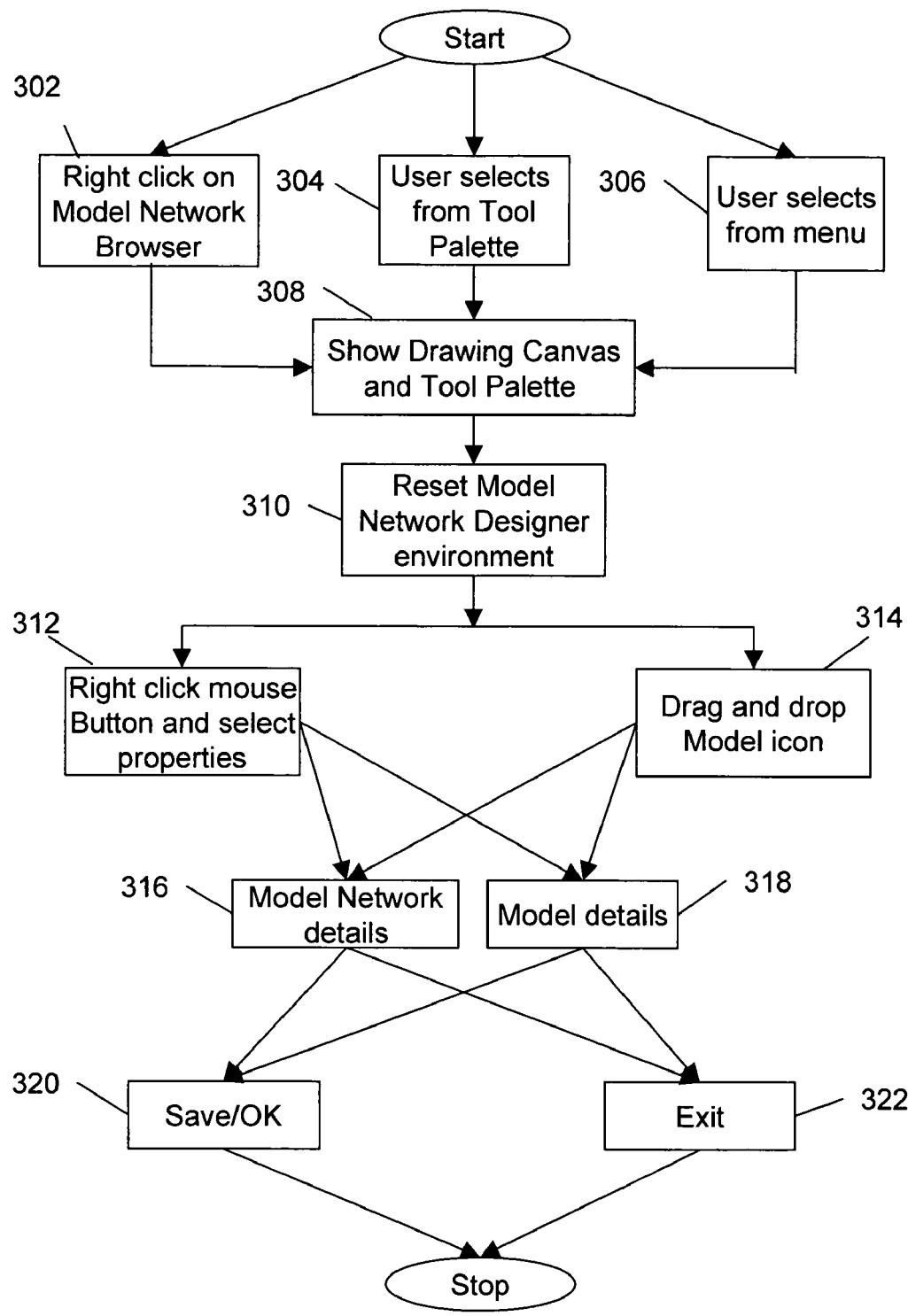
FIG. 3 is a flow chart depicting various steps performed to create applications based on Model Networks.

FIG. 3 is a flow chart depicting various steps performed to create Model Networks in accordance with a preferred embodiment of the present invention. There are three ways of invoking the Model Network component as described in the co-pending patent application Ser. No. 10/336,965, titled 'Business Process Technology for the Enterprise'. This patent application has been filed by Rage Frameworks, Inc. on Jan. 6, 2003 which is incorporated by reference as if set forth herein in its entirety. The designer may right click on the User Interface (UI) component from the Object Browser to invoke Model Network Designer 207. Alternatively, the designer may pick the Model Network component from the Tool Palette. Otherwise, the designer may select the Model Network component from a menu. Selecting the Model Network component from the menu involves highlighting Model Network component from the Object Browser and clicking on the "Open" icon from the menu. The above three steps are represented respectively by steps 302, 304 and 306 in FIG. 3.

At step 308, a Drawing Canvas and a Tool Palette (shown in FIG. 4) for the Model Network component are displayed. The Drawing Canvas and the Tool Palette for the Model Network component are displayed using Model Network Designer 207. At step 310, the Model Network Designer 207 environment is reset. This reset includes the reset of Component State, Menu State, Toolbar State, Properties State, Tool Palette State and Status Bar State.

The designer may proceed with any of the two steps 312 or 314 to create a Model Network. The designer may either right click the mouse button on the Drawing Canvas to define a Model Network (at step 312), or drag and drop Models using a Model icon from the Tool Palette in the Drawing Canvas to create a Model Network (at step 314). In both cases, the designer is provided with an option of specifying Model Network details or Model details. If the designer chooses to define properties of the Model Network, the designer is directed to a Model Network Detail screen (shown in FIG. 6) at step 316. On the other hand, if the designer chooses to define Model details, the designer is directed to a Model Properties Screen (shown in FIG. 7).

After specifying the Model Network details and details of the Models that constitute the Model Network, the designer may opt to save at step 320 or exit at step 322 without saving changes made by him/her.

Figure 4:
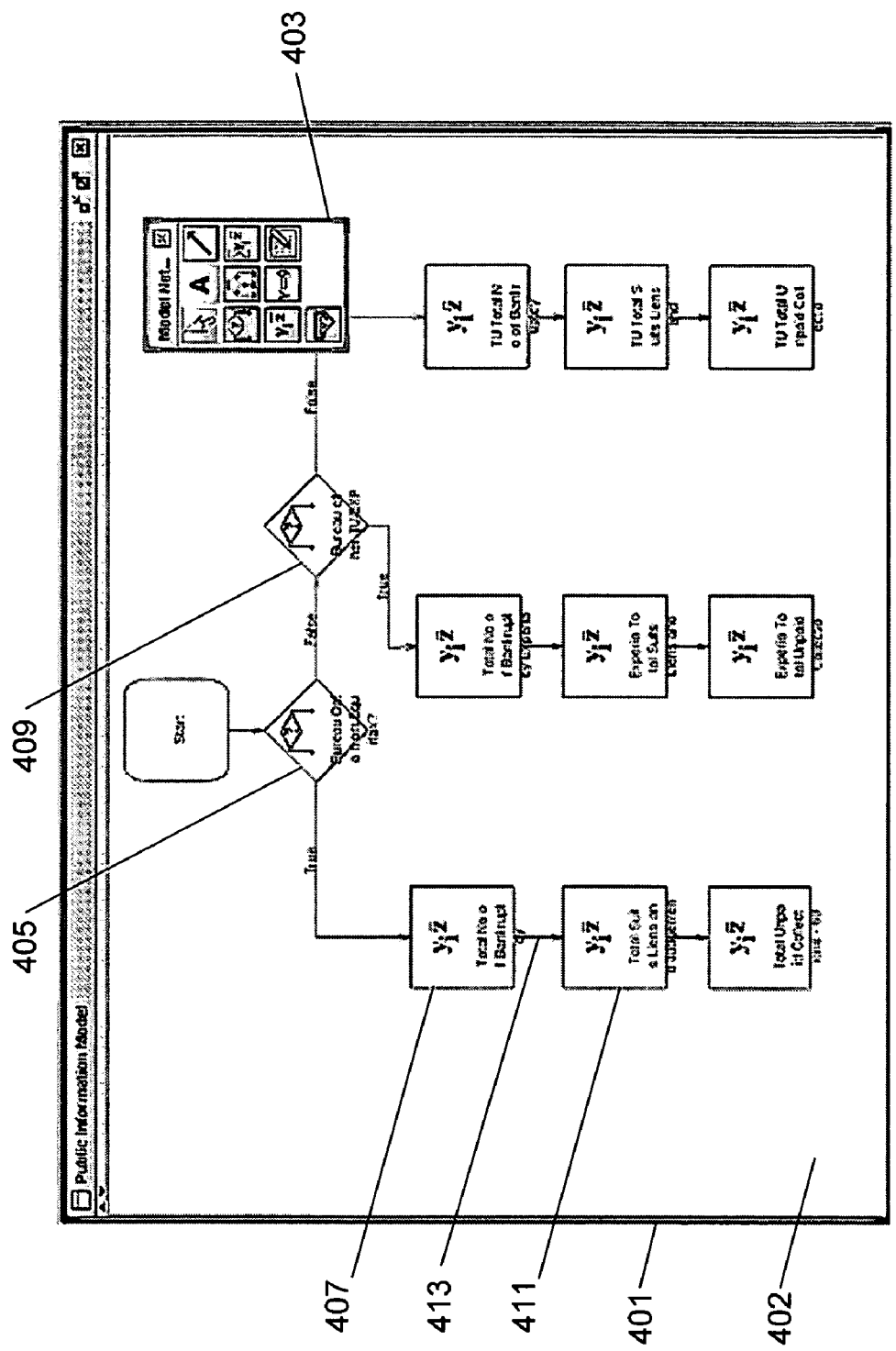
FIG. 4 is a screenshot of a Model Network screen.

FIG. 4 is a screenshot of a Model Network screen 401 that appears when the designer chooses to create a Model Network. Model Network screen 401 comprises a Drawing Canvas 402 and a Tool Palette 403. Drawing Canvas 402 is blank, if the designer opts to create a new Model Network. In case the designer opts to modify an existing Model Network, Drawing Canvas 402 displays the network diagram of that Model Network. Drawing Canvas 402 shown in FIG. 4 displays a network diagram corresponding to an existing Model Network chosen by the designer. However, the designer can also design a similar Model Network using icons available in Tool Palette 403. A Model Network on Drawing Canvas 402 is presented in the form of a flowchart/network consisting of reusable components.

At step 405, a Rule exists, which defines a conditional relationship to be verified before proceeding to the next step. In case the designer wants to add a new Rule, the designer drags and drops the Rule icon from Tool Palette 403 to Drawing Canvas 402 and defines its properties. In a Model Network, a Rule is used to connect different Models and Model Networks in a logical order. For example, in the Model Network shown in FIG. 4, if the condition specified at step 405 is true, next step of the Model Network will be step 407, which is computation of a Model. On the other hand, if the condition specified at step 405 is false, next step will be step 409, which is computation of another Rule.

At step 407, a Model exists. A Model corresponds to a mathematical expression. In case the designer wants to design a new Model, he/she can drag the Model icon from Tool Palette 403 to Drawing Canvas 402 and define its meta-data. Various components of a Model Network are connected using a Line component. For example, in the Model Network shown in FIG. 4, the Model corresponding to step 411 is connected to the Model corresponding to step 407 using an instance of the Line component at step 413. This implies that execution of the Model corresponding to step 411 follows execution of the Model corresponding to step 407. In case the designer wants to add an instance of the Line component, he/she drags and drops the Line icon from Tool Palette 403 to Drawing Canvas 402 and defines meta-data. Thus, the designer creates a Model Network by selecting various Models, Model Networks, Rules and DTs and connecting them using instances of the Line component.

Figure 5:
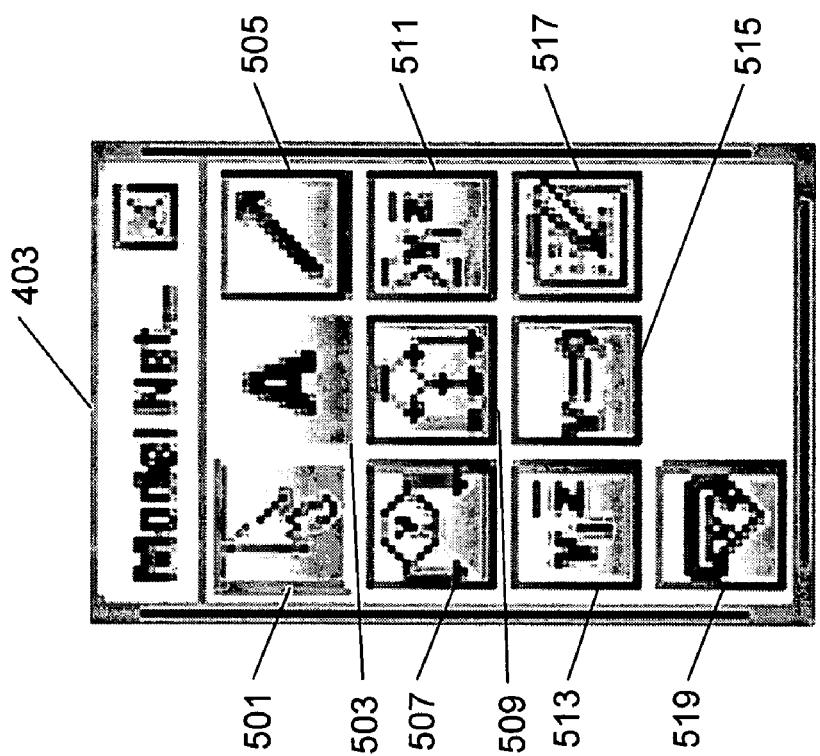
FIG. 5 is a Tool Palette provided with the Model Network screen.

FIG. 5 illustrates the various icons provided in Tool Palette 403 that enable the designer to design a Model Network. Tool Palette 403 contains following icons—a Selector icon 501, a Text icon 503, a Line icon 505, a Rule icon 507, a Decision Tree icon 509, a Model Network icon 511, a Model icon 513, an Assignment Object icon 515, a Task icon 517 and a Message Task icon 519. Selector icon 501 is used to select an object in Drawing Canvas 402. Text icon 503 is used for annotation of Models, Rules, DTs, etc. used in a Model Network. For example, in FIG. 4, the Model at step 407 is annotated with text 'Total No. of Bankruptcy'. Line icon 505 is used to connect Models, Model Networks, Rules, DTs and Assignment Objects to form a Model Network. Rule icon 507, Decision Tree icon 509, Model Network icon 511, Model icon 513 and Assignment Object icon 515 are used to add a Rule, DT, Model Network, Model and Assignment Object respectively to the Model Network being designed. Task icon 517 is used to call any one of the four components—Rule, DT, Model and Model Network. Message Task icon 519 is used to send an SMTP (Simple Mail Transfer Protocol) compliant mail message or log a user defined message in a log file. SMTP is a TCP/IP protocol used for sending and receiving e-mails.

When the designer drops an instance of the Model component (Model icon 513) on Drawing Canvas 402 from Tool Palette 403, a flowchart item with cross-hashed lines appears. The flowchart item for a Model is a rectangle with an image in it. Double click on this flowchart item brings up a Model Properties screen (shown in FIG. 7). Once the properties have been specified and the designer clicks on an OK tab of the properties screen, the flowchart item's hashed lines get removed with a display label. The display label shows a name of the Model in case the Model is created independently. The name of the Model is specified in the Model Properties Screen for Model (shown in FIG. 7). In case the Model is created under a Model Network, the display label shows 'Model name—Model Network name'. Thereafter, double click on the flowchart item brings up a Tasks screen (shown in FIG. 15), where the designer specifies the processes that lead to this Model.

Figure 15:
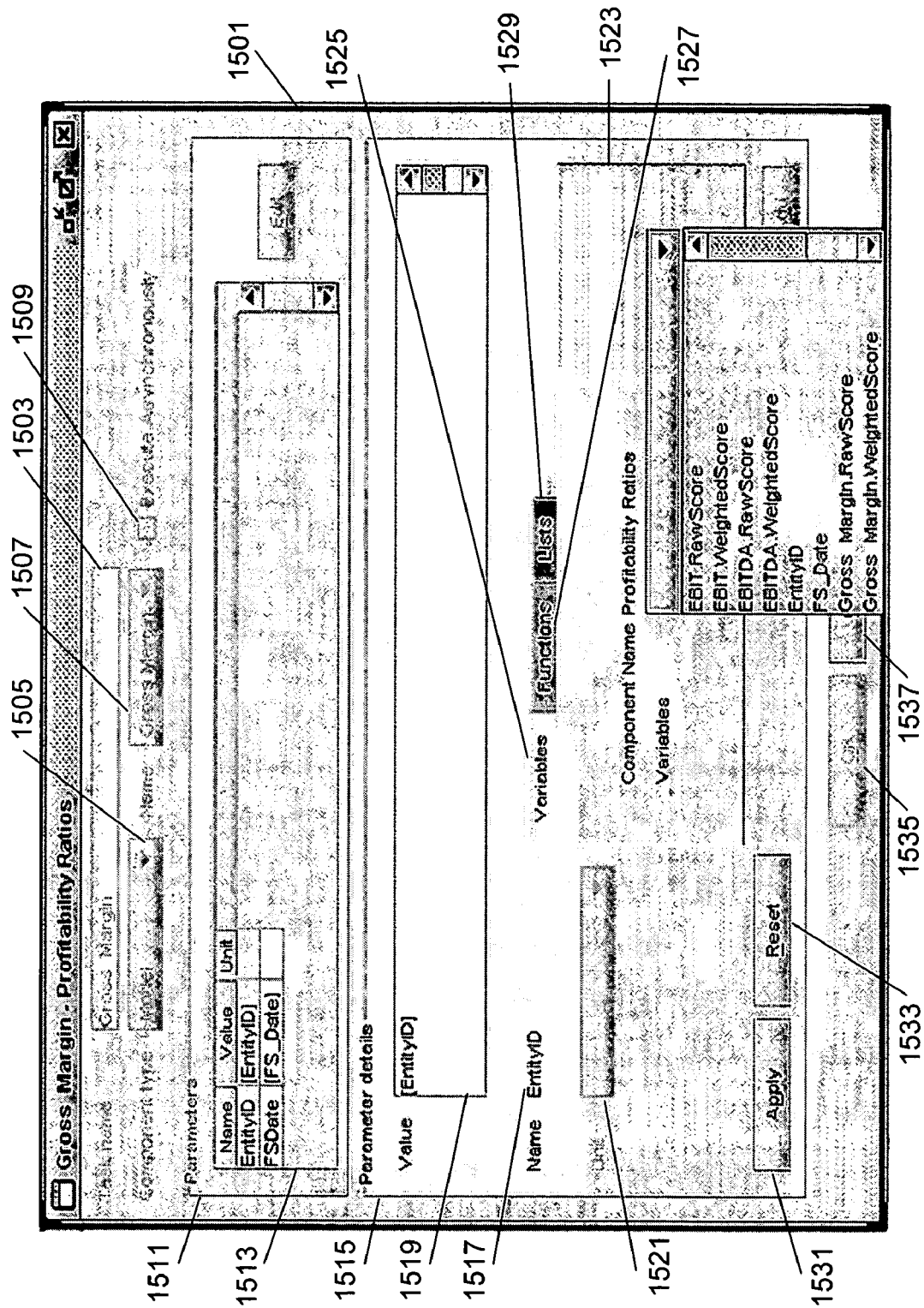
FIG. 15 is a screenshot of a Task screen.

Another icon on Tool Palette 403 is Model Network icon 511. When the designer drops an instance of the Model Network component (Model Network icon 511) on Drawing Canvas 402 from Tool Palette 403, a flowchart item with cross-hashed lines appears. Double click on this flowchart item brings up a Model Network Details screen (shown in FIG. 6). Once the properties have been specified and the designer clicks on an OK tab of the Model Network Details screen, the flowchart item's hashed lines get removed with a display label. The display label shows a name of the Model Network as specified in the Model Network Details screen. Thereafter a double click on the flowchart item brings up a Tasks screen (an example of a Tasks screen is shown in FIG. 15).

There also exists Rule icon 507 on Tool Palette 403. When the designer drops an instance of the Rule component (Rule icon 507) on Drawing Canvas 402 from Tool Palette 403, a flowchart item with cross-hashed lines appears. Double click on this brings up a properties screen for the Rule (shown in FIG. 9). Once the properties have been specified and the designer clicks on an OK tab of the properties screen, the flowchart item's shape changes to a rectangle with a display label. The display label shows the name of the Rule as specified in the properties screen for the Rule (shown in FIG. 9). Thereafter a double click on this brings up a Tasks screen (an example of a Tasks screen is shown in FIG. 15).

Another icon on Tool Palette 403 is a Decision Tree (DT) icon 509. When the designer drops an instance of the DT component (DT icon 509) on Drawing Canvas 402 from Tool Palette 403, a flowchart item with cross-hashed lines appears. Double click on this flowchart item brings up a properties screen for DT (shown in FIG. 11). Once the properties have been specified and the designer clicks on an OK tab of the properties screen, the flowchart item's hashed lines get removed with a display label as specified in the properties screen for DT. Thereafter, a double click on the flowchart item brings up a Tasks screen (an example of a Tasks screen is shown in FIG. 15).

Another icon provided on Tool Palette 403 is Assignment Object icon 515. When the designer drops an instance of the Assignment Object (Assignment Object icon 515) on Drawing Canvas 402 from Tool Palette 403, a flowchart item with cross-hashed lines appears. Double click on this flowchart item brings up a properties screen for the Assignment Object (shown in FIG. 10). Once the properties have been specified and the designer clicks on an OK tab of the properties screen, the flowchart item's hashed lines get removed with a display label as specified in the properties screen for the Assignment Object. Thereafter a double click on the flowchart item brings up the Tasks screen (an example of a Tasks screen is shown in FIG. 15).

Figure 6:
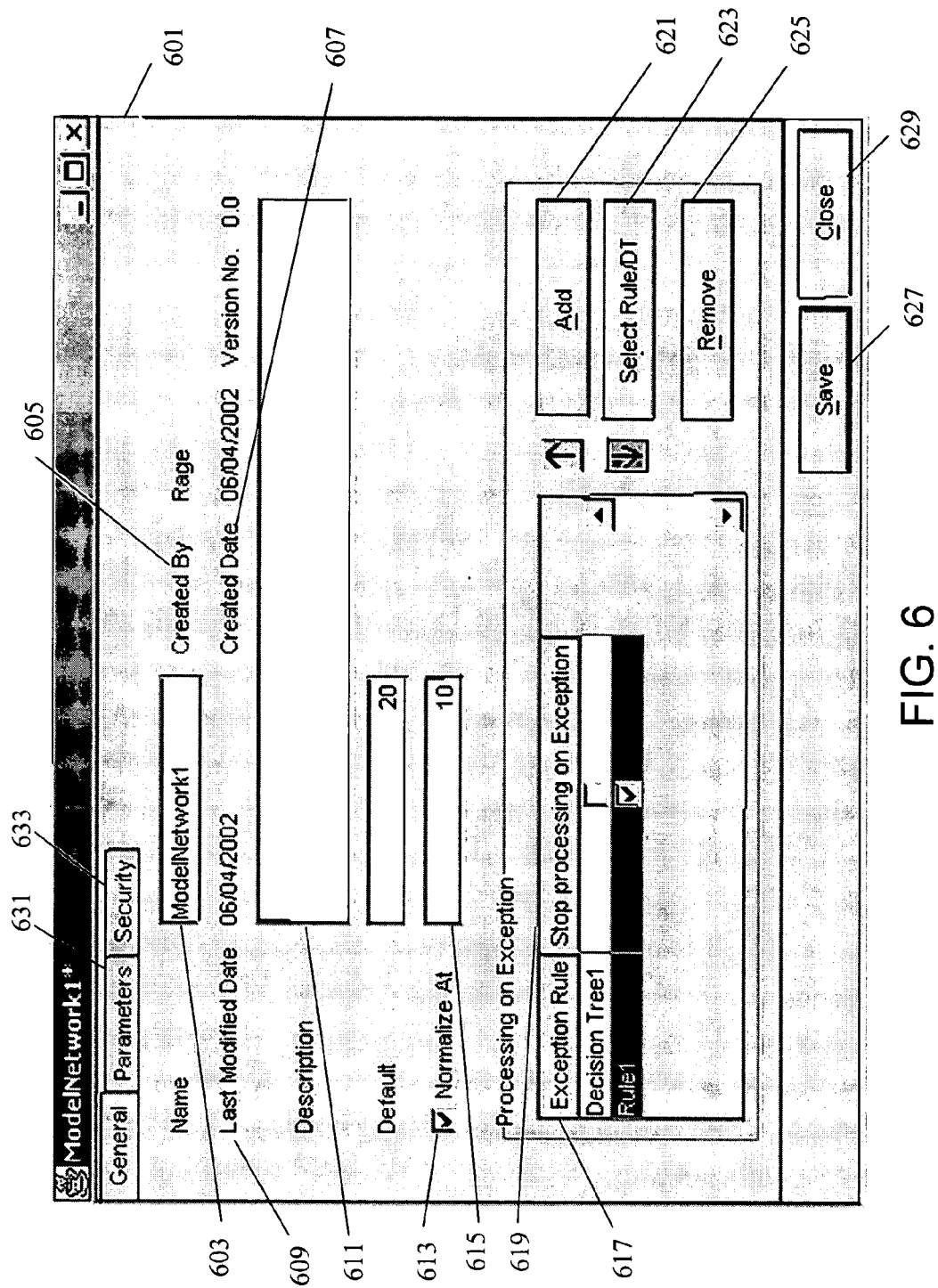
FIG. 6 is a screenshot of a Model Network Details screen.

FIG. 6 is a screenshot of a Model Network Details screen 601, which opens when the designer selects Model Network icon 511 from Tool Palette 403. This screen contains details characteristic to the Model Network. A Text box 603 is used for providing a name to the Model Network. Labels 605, 607 and 609 are labels for "Created By", "Created Date" and "Last Modified Date" respectively. A Text area 611 represents an area where the designer provides a description of the Model Network. A checkbox 613 enables the designer to activate or deactivate a 'Normalize At' function. The 'Normalize At' function normalizes the output of the Model Network by a value specified by the designer. In case the designer activates the 'Normalize At' function, he/she specifies the value, by which the Model Network is normalized, in a field 615. By default, checkbox 613 is checked in Model Network Details screen 601. A value specified in field 615 is the default value assigned to the Model Network output when an exception occurs and an option 'Stop Processing on Exception' 619 is checked. An 'Exception Rule' 617 option lists various DTs and Rules used in the Model Network. Corresponding to each entry in 'Exception Rule' 617, there exists a check box under 'Stop Processing on Exception' 619 option. The following cases may arise in case of exceptions:

Case 1: If 'Stop processing on Exception' 619 is checked and if exception rule succeeds, then the Model Network stops executing, default value is assigned to the Model Network and the result of the exception rule is stored as the result.

Case 2: If 'Stop processing on Exception' 619 is checked and if exception rule fails, then the Model Network is executed and the result of the exception rule is stored as the result.

Case 3: If 'Stop processing on Exception' 619 is un-checked and if exception rule succeeds, then the Model Network is executed and the result of the exception rule is stored as the result.

Case 4: If 'Stop processing on Exception' 619 is un-checked and if exception rule fails, the Model Network is executed and the result of the exception rule is stored as the result.

Regardless of the option chosen, the exception rules are always executed and the exception rule results are stored in the Model Network results.

An Add button 621 is provided in Model Network Details Screen 601. Using this button a Rule or a DT can be added in 'Exception Rule' 617 list. A 'Select Rule/DT' button 623 is provided that enables the designer to select a particular Rule or DT used in the Model Network. A Remove button 625 enables the designer to delete selected Rule or DT from 'Exception Rule' 617 list. A Save button 627 enables a designer to save details of the Model Network provided by him. A Close button 629 is used to close Model Network Details Screen 601.

Figure 7:
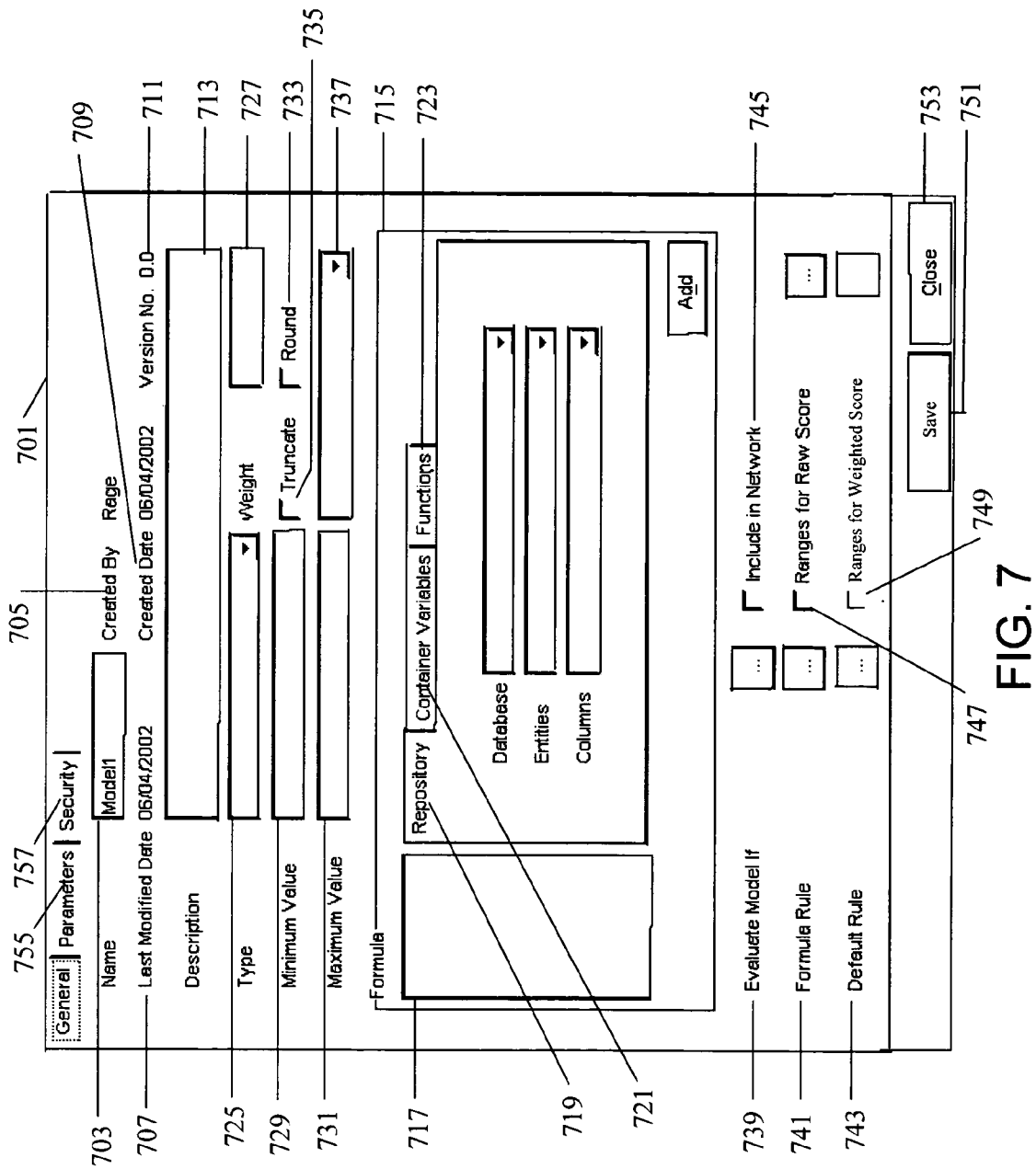
FIG. 7 is a screenshot of a Model Properties screen.

Another icon on Tool Palette 403 is Model icon 513. When the designer drops an instance of the Model (Model icon 513) on the Model Network Screen 401 from Tool Palette 403, a flowchart item with cross-hashed lines appears. A double click on this brings up a Model Properties screen 701 as shown in FIG. 7. This screen enables the designer to define the properties of a Model. In a Name block 703, the designer provides a name for the Model. Against labels 705, 707, 709 and 711, information related to "Created by", "Last Modified Date", "Created Date" and "Version No." respectively is captured. In a Text area 713, the designer provides a description of the Model. A block 715 represents the mathematical formula and related information on which the Model is based. In block 715, the designer defines an expression corresponding to the Model in a Text area 717. Tabs 719, 721 and 723 define Repository, Container Variables and Functions respectively. The Repository, Container Variables and Functions defined using tabs 719, 721 and 723 are used in the mathematical expression defined in Text area 717. For example, Repository tab 719 can be used to specify details such as Database, Entities and Columns from which value of a particular variable used in expression can be extracted.

A Type block 725 is used to define the data types that are to be used for calculations of the Model. A dropdown menu is attached to Type block 725, which shows "Numeric" and "String" as two options to be chosen from. If the designer specifies a numeric data type, there are other parameters to be specified using a Weight box 727, a Minimum Value box 729, a Maximum Value box 731, a Round checkbox 733, a Truncate checkbox 735 and a dropdown 737 common to both Round checkbox 733 and Truncate checkbox 735. Weight box 727 defines the weight of the expression. Minimum Value box 729 and Maximum Value box 731 respectively define minimum and maximum values of the expression. Round checkbox 733 and Truncate checkbox 735 can be checked to specify if the final value of the expression be rounded off or truncated. Dropdown 737 shows values 0, 1, 2, 3 and 4. Selecting any of these values from the dropdown would define the number of digits to be shown after the decimal point. If the designer specifies a string data type, then Weight box 727, Minimum Value box 729, Maximum Value box 731, Truncate checkbox 735, Round checkbox 733 and dropdown 737 are disabled. An Evaluate Model If " . . . " button 739 relates to an "If clause" which is considered for execution. An example of the "If clause" is: if a 'previous model result' >0 or if a 'parameter value' >0. A Formula rule " . . . " button 741 defines the step to be performed in case the "If clause" specified in Evaluate Model If " . . . " button 739 is satisfied. In case the "If clause" of Evaluate Model If " . . . " button 739 fails, the next step would correspond to a step defined in a Default Rule " . . . " button 743.

An 'Include in Network' checkbox 745 enables the designer to specify whether the Model is an intermediate Model, i.e. just for computational purposes or it is listed as a selectable Model. In case the designer checks 'Include in Network' checkbox 745, the Model becomes available as a defined Model while developing other Model Networks in System 200. A 'Ranges for Raw Score' checkbox 747 and 'Ranges for Weighted Score' checkbox 749 are used to define ranges for the raw score and weighted score respectively, if required. Ranges and Range Scores facilitate the modeling of point-scoring systems. A Save button 751 enables the designer to save the changes and close the window. A Close button 753 enables the designer to directly close the window without saving the changes. When Save button 751 is pressed, the inputs made by the designer are checked against standard validations such as the input corresponding to Name block 703 should not be null and should be of a maximum of 30 characters. Other validations include that the description in Text area 713 should not be null and should not exceed 150 characters.

Figure 8:
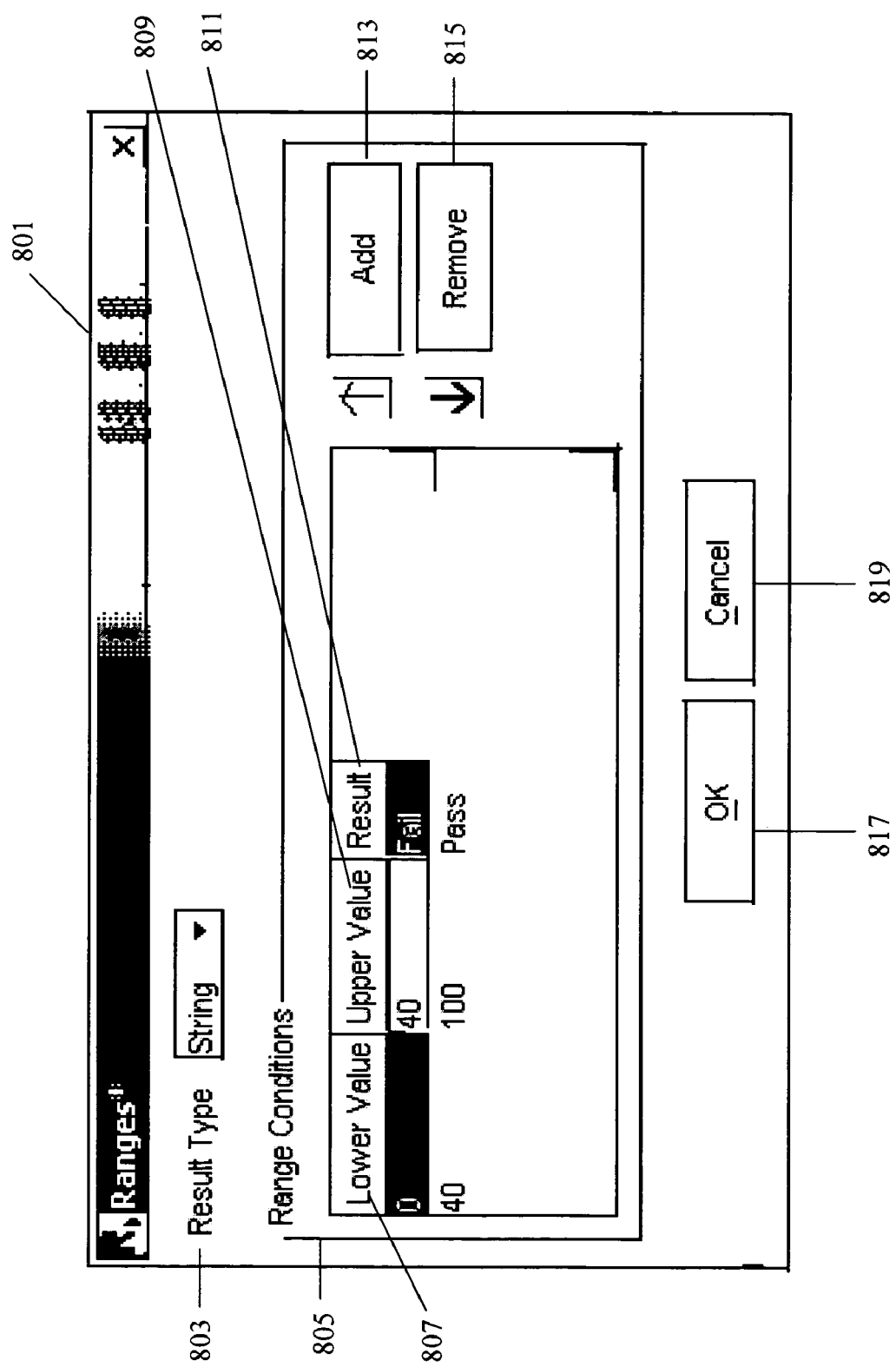
FIG. 8 is a screenshot of a Range window used to define range for the output of a model.

FIG. 8 shows a Range window 801, which can be used to specify 'Ranges for Raw Score' and 'Ranges for Weighted Score'. This window opens when 'Ranges for Raw Score' 747 and 'Ranges for Weighted Score' 749 checkboxes are checked and the corresponding tabs are double-clicked. A Result Type dropdown 803 is used to define whether the data type is numeric or string. The details of the range conditions can be specified in a Range Conditions box 805. Various ranges and corresponding results can be specified using Lower Value, Upper Value and Result tabs 807, 809 and 811 respectively. A range can be defined by defining the Model's lower and upper values. Also, corresponding to each lower value and upper value set, a result is specified under a Result Tabs 811. In the case of a String Data type, only Upper Range is required. Any number of such ranges can be defined. The designer adds a new range by clicking on an Add button 813. An existing range can be deleted by highlighting it and clicking on a Remove button 815. Pressing an OK button 817 closes Range window 801 incorporating the changes made. A Cancel button 819 however closes the window without incorporating any of changes made.

Figure 9:
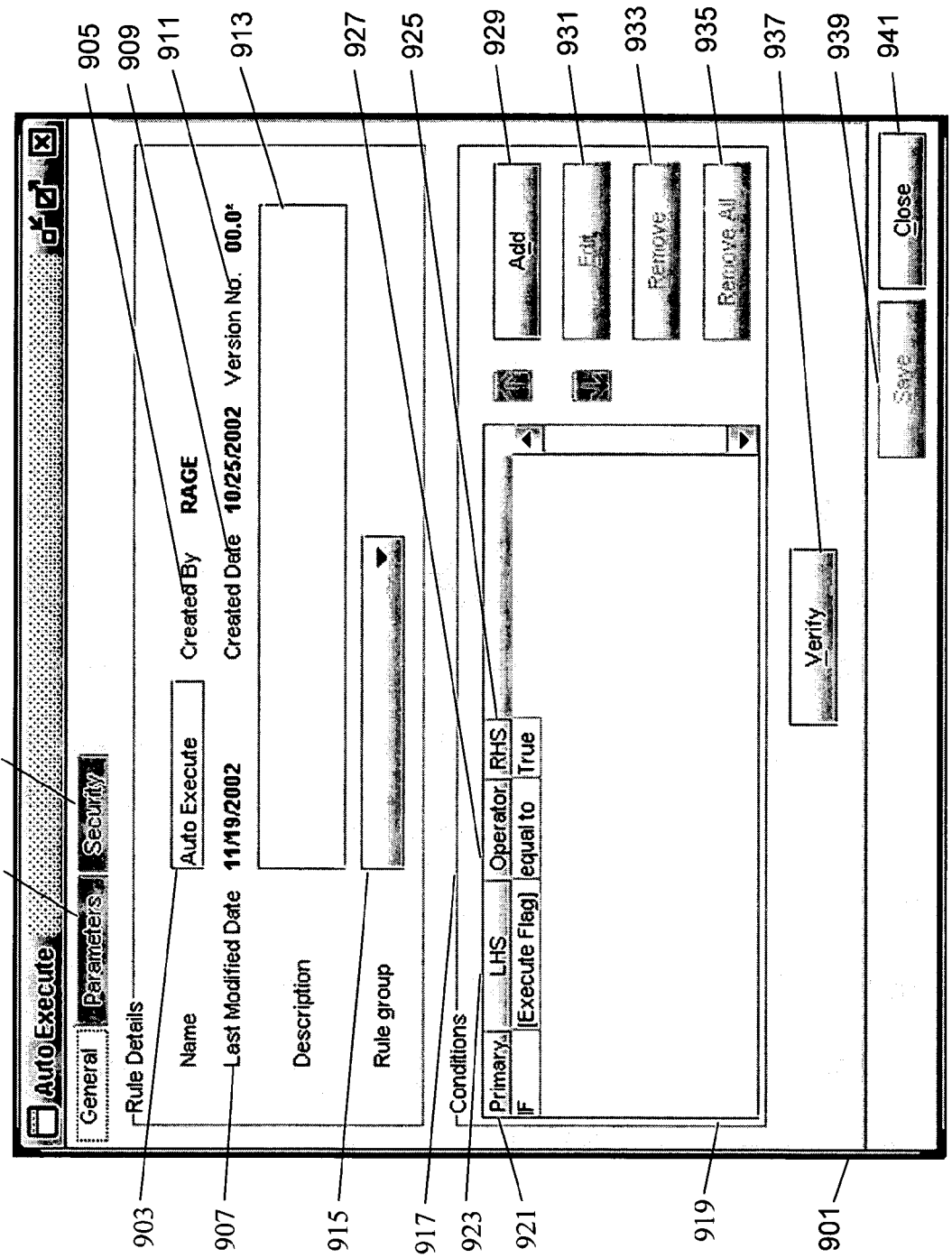
FIG. 9 is a screenshot of a Rule screen that is used to define a Rule.

Another icon on Tool Palette 403 is Rule icon 507. When the designer drops an instance of the Rule (Rule icon 507) on Model Network Screen 401 from Tool Palette 403, a flowchart item with cross-hashed lines appears. A double click on this brings up a Rule screen 901 as shown in FIG. 9. Rule screen 901 enables the designer to define a Rule. In a Name block 903, the designer specifies a name for the Rule. Against labels 905, 907, 909 and 911, information related to "Created by", "Last Modified Date", "Created Date" and "Version No." respectively is captured. In a Text area 913, the designer provides a description of the Rule. A Rule group dropdown 915 provides an option to the designer to assign the Rule to a group. This enables the designer to categorize Rules in different groups. For example, all Rules related to financial data can be grouped under 'Financial Data Rules'. Thus, using Rule group dropdown 915 the designer adds a new Rule to one of the categories provided in the dropdown.

The designer specifies Rule conditions in a Conditions box 917. In a Primary column 921 of a Table 919, the designer specifies an 'IF' entry. Other entries valid for this column include 'AND' and 'OR'. Here, 'IF' is an implied 'AND'. In an LHS column 923, the designer specifies the left hand side (LHS) of the Rule. LHS of a Rule can be a mathematical expression or a Boolean expression. In the example Rule provided in FIG. 9, LHS of the Rule is an expression called 'Execute Flag'. In an RHS column 925, the designer specifies the right hand side (RHS) of the rule. RHS of a Rule can be a mathematical expression or a Boolean expression. In the example Rule provided in FIG. 9, RHS of the Rule is a Boolean expression 'True'. In an Operator column 927, the designer specifies an operator between LHS and RHS expressions of the Rule. The operator of a Rule can be 'equal to', 'greater than', 'smaller than', etc. In the example Rule provided in FIG. 9, the operator defined is 'equal to'. An Add tab 929 enables the designer to add a Rule in Table 919. An Edit tab 931 enables the designer to edit a Rule selected in Table 919. A Remove tab 933 enables the designer to remove a Rule from Table 919. A Remove All tab 935 enables the designer to remove all Rules defined in Table 919. A Verify tab 937 enables the designer to verify that the Rule does not have any specification errors. For example, verification is made to check if all mandatory information has been provided, if there is no syntactical error, etc. The designer saves the changes made by him/her using a Save tab 939 and closes Rule screen 901 using a Close tab 941.

Figure 10:
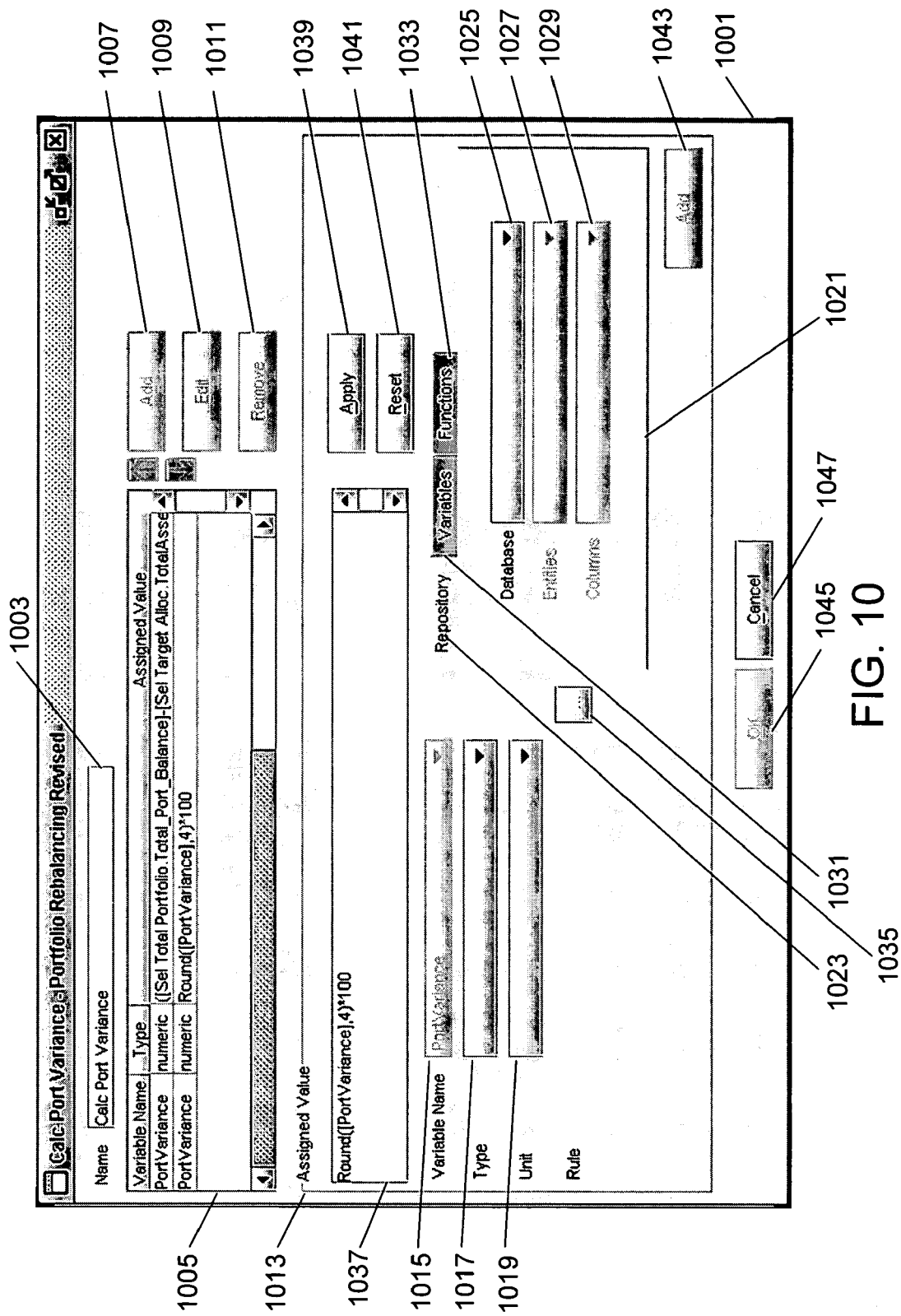
FIG. 10 is a screenshot of an Assignment Object screen used to define an Assignment Object.

One of the icons in Tool Palette 403 is Assignment Object icon 515. When the designer drops an instance of the Assignment Object (Assignment Object icon 515) on Model Network Screen 401 from Tool Palette 403, a flowchart item with cross-hashed lines appears. A double click on this brings up an Assignment Object screen 1001 as shown in FIG. 10. This screen enables the designer to define an Assignment Object. In a Name field 1003, the designer inputs a name for the Assignment Object. In a Table 1005, the designer specifies a number of variables and the values assigned to the variables. In Table 1005, designer captures the names of the variables, type of the variables and values assigned to the variables. As shown in Table 1005, the designer specifies type and a value for a variable called 'PortVariance'. An Add tab 1007 enables the designer to add a new variable in Table 1005. An Edit tab 1009 allows the designer to edit the value assigned to any variable in Table 1005. A Remove tab 1011 enables the designer to delete any variable from Table 1005.

The variables and their assigned values as shown in Table 1005 are specified using an Assigned Value box 1013. The designer selects a variable from a Variable Name dropdown 1015. All variables provided in Variable Name dropdown 1015 are those defined in the Model Network. After selecting a variable, the designer specifies the type of the variable using a Type dropdown 1017. Options provided in Type dropdown 1017 are 'Numeric', 'Boolean' 'Datetime' and 'String'. Using a Unit dropdown 1019, the designer specifies the unit of the selected variable. A Box 1021 allows the designer to assign a value to the variable using fields of a repository, other variables defined previously as part of the Model Network or a set of built-in functions. A Repository tab 1023 allows the designer to assign value to the variable using the fields of a repository. A Database dropdown 1025 enables the selection of the required database. Within the selected database, the designer uses a Table Entity dropdown 1027 and a Columns dropdown 1029 to refer to the required field. Table Entity dropdown 1027 enables the designer to select a table in the selected database. Columns dropdown 1029 enables the designer to select a column in the selected table. A Variables tab 1031 and a Functions tab 1033 are used respectively to refer to other variables defined previously as part of the Model Network and a set of built-in functions. A Filter Rule box 1035 allows the designer to apply a filter to the database selection (defined using Repository tab 1023) so that the correct field is selected. For example, if there are two financial statements for an account in the database, one of the fields that is required for the assigned value needs to be retrieved from the table. Filter Rule box 1035 enables the designer to specify which of the two fields should be retrieved. The value assigned to the selected variable is defined in a Text box 1037. An Apply tab 1039 enables the designer to apply the value specified in Text box 1037 to selected variable. A Reset tab 1041 allows the designer to reset Text box 1037. An Add tab 1043 allows the designer to add the specifications provided in Assigned Value box 1013 to Table 1005. Using an OK tab 1045 the designer saves the changes made and using a Cancel tab 1047 the designer cancels the changes made.

Figure 11:
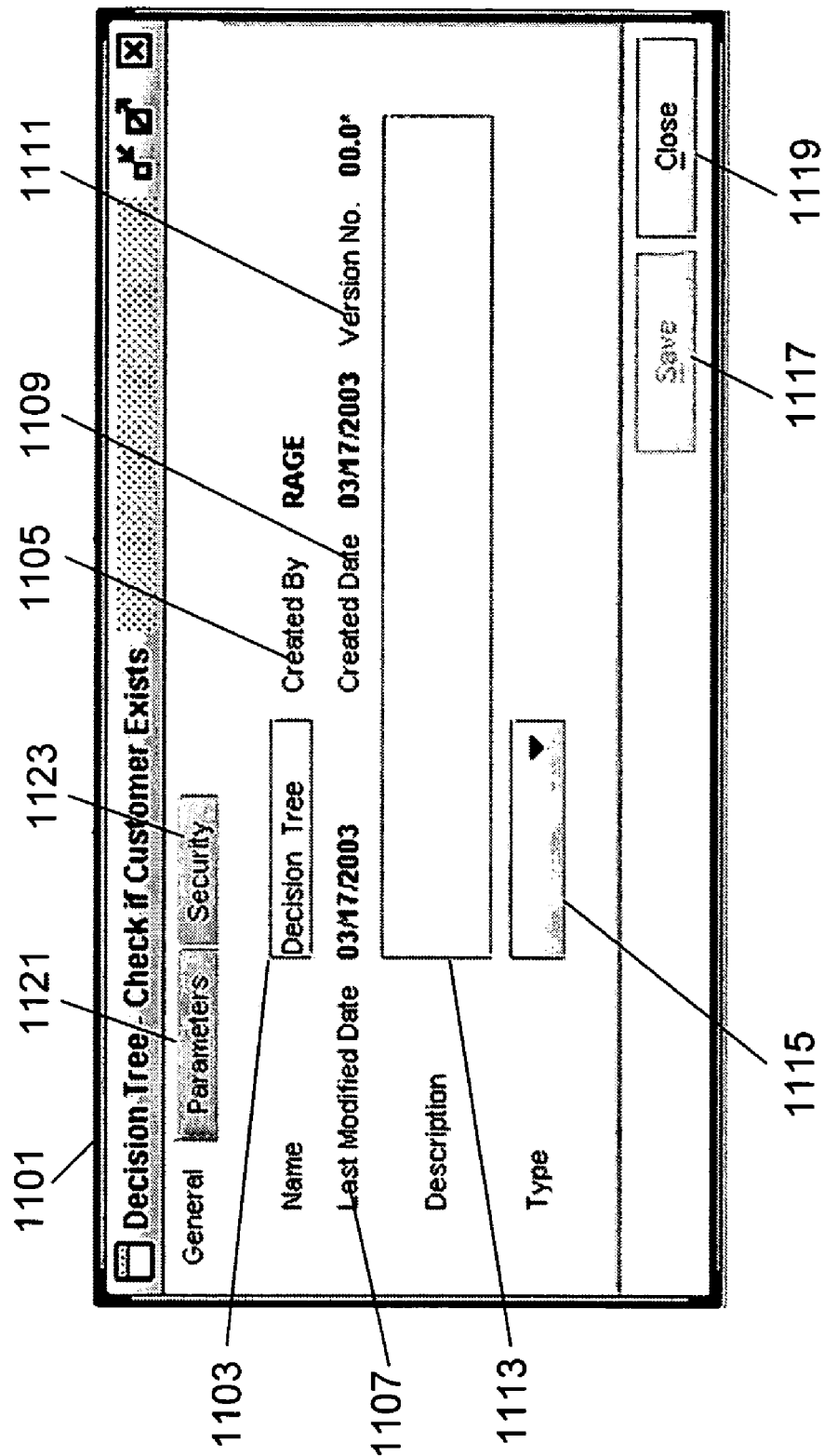
FIG. 11 is a screenshot of a Decision Tree Details screen that is used to define a Decision Tree.

One of the icons in Tool Palette 403 is Decision Tree (DT) icon 509. When the designer drops an instance of the DT on Model Network Screen 401 from Tool Palette 403, a flowchart item with cross-hashed lines appears. Double click on this brings up a DT Properties screen 1101 as shown in FIG. 11. This screen enables the designer to define a DT. A DT comprises a number of Rules connected in a logical sequence. The designer specifies a name for the DT using a Text box 1103. Labels 1105, 1107, 1109 and 1111 are labels for "Created By", "Last Modified Date", "Created Date" and "Version No." respectively. A Text area 1113 represents an area where the designer provides a description of the DT. A Type dropdown 1115 enables the designer to specify the type of DT. The designer can design one of three types of DTs: conditional, sequential and hybrid. A conditional DT is the most common and implies that the rules are connected to each other and are evaluated conditionally. Each rule has a binary outcome and execution proceeds according to the structure of the tree. A sequential DT on the other hand is a series of rules that are evaluated one after another. A hybrid DT is a combination of the conditional DT and sequential DT. A Save tab 1117 enables the designer to save changes made by him/her and a Close tab 1119 enables the designer to close DT Properties screen 1101.

Figure 12:
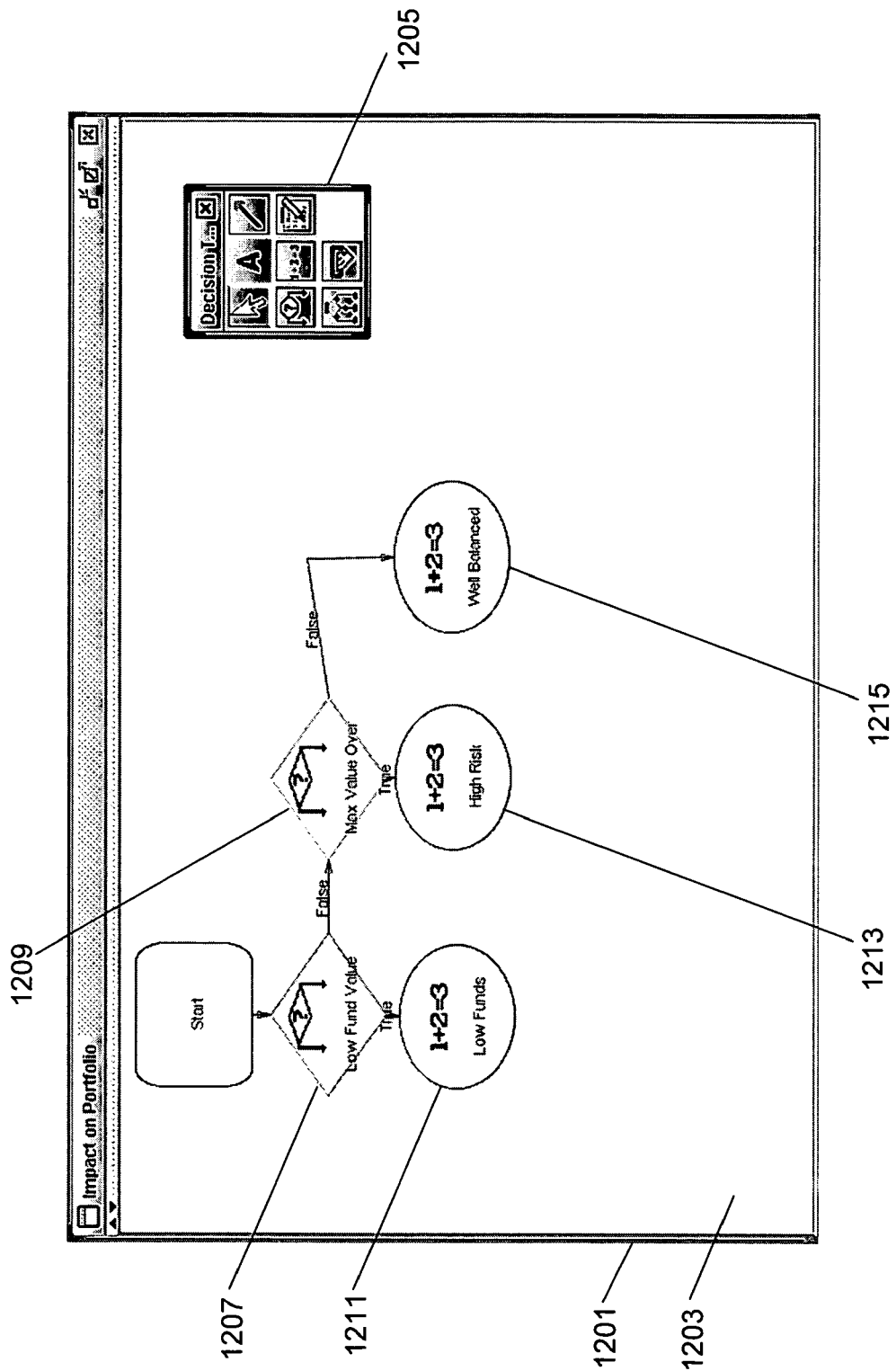
FIG. 12 is a screenshot of a Decision Tree screen.

After specifying the properties of a DT, the designer creates the DT using a DT screen 1201 shown in FIG. 12. DT screen 1201 provides a Drawing Canvas 1203 and a DT Tool Palette 1205. The designer creates the DT on Drawing Canvas 1203 using components provided in DT Tool Palette 1205. The DT as shown in FIG. 12 comprises two instances of the Rule component at steps 1207 and 1209. A 'False' output of the Rule at step 1207 is connected to the Rule at step 1209. 'True' output of the Rule at step 1207 is connected to a Model at step 1211. The 'True' and 'False' outputs of the Rule at step 1209 are connected to Models at step 1213 and 1215 respectively. DT Tool Palette 1205 consists of various items that are needed to define a DT. Some of the items in DT Tool Palette 1205 are—a Selector icon 501, a Text icon 503, a Line icon 505, a Rule icon 507, a Decision Tree icon 509, a Model icon 513, a Task icon 517 and a Message Task icon 519.

The properties screen for components like Model Network, Model, Rule and DT, as shown in FIG. 6, FIG. 7, FIG. 9 and FIG. 11 respectively, correspond to general properties. Besides general properties, parameter and security specific details are provided by the designer. Parameter specific details and security specific details are specified by the designer using a Parameter Panel (shown in FIG. 13) and a Security Panel (shown in FIG. 14) respectively. The Parameter Panel and the Security Panel are similar for every component.

Figure 13:
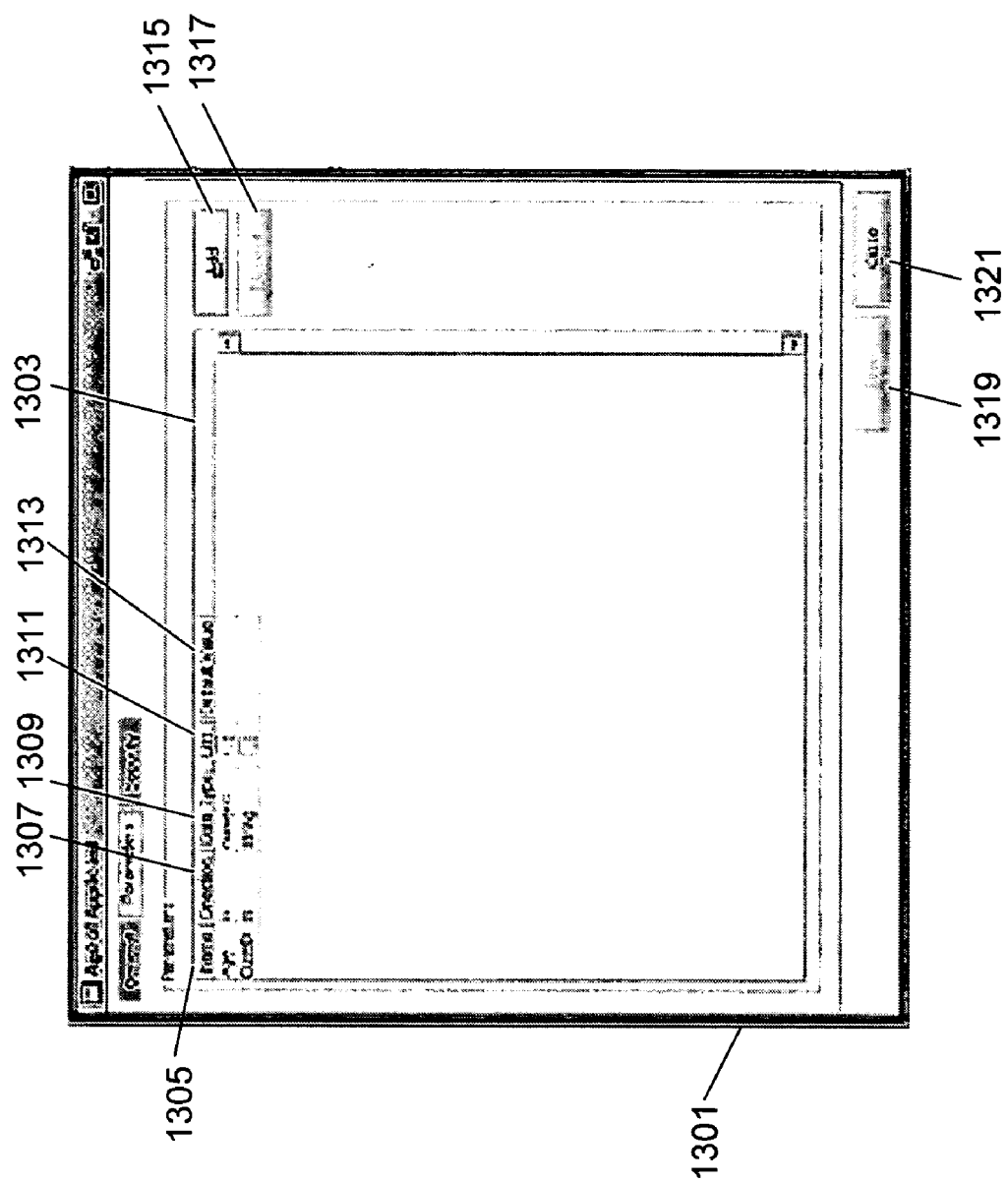
FIG. 13 is a screenshot of Parameter Panel that enables a designer to specify parameter details for components like Model, Model Network and Rule.

FIG. 13 shows a screenshot of a Parameter Panel 1301 that enables the designer to specify parameter details for the components such as Model, Model Network, Rule and DT. Parameter Panel 1301 is shown to the designer when he/she clicks on Parameters tab 631 of Model Network Details screen 601, Parameters tab 755 of Model Properties Screen 701, Parameters tab 943 of Rule screen 901 and Parameters tab 1121 of DT Properties screen 1101. Parameter Panel 1301 shown in FIG. 13 provides parameter details of a Model called "Age of Applicant". Various parameters that are used in the Model "Age of Applicant" are provided in a table 1303. In table 1303, the designer specifies names to the parameters under a Name column 1305. Under a Direction column 1307, the designer specifies whether the parameters are IN, OUT or IN/OUT. IN parameters are the parameters that are required by the task. This implies, in case of Parameter Panel 1301, IN parameters are required by the task defined by the Model "Age of Applicant". OUT parameters are the parameters that are produced by the task. This implies, in case of Parameter Panel 1301, OUT parameters are produced by the task defined by the Model "Age of Applicant". IN/OUT parameters are the parameters that are required as well as produced by the task. Such parameters are used by the task and modified to produce an output. Under a 'Data Type' column 1309, the designer specifies whether a parameter is of numeric type or string type. In case the parameter value is one of the values defined in a list, the checkbox in a 'List' column 1311 is checked. Under a 'Default Value' column 1313 the designer defines a default value for the parameters. The designer adds a parameter in table 1303 using an Add button 1315 and removes a parameter from table 1303 using a Remove button 1317. A Save button 1319 is provided to save the changes made by the designer. A Close button 1321 is provided to close Parameter Panel 1301.

Figure 14:
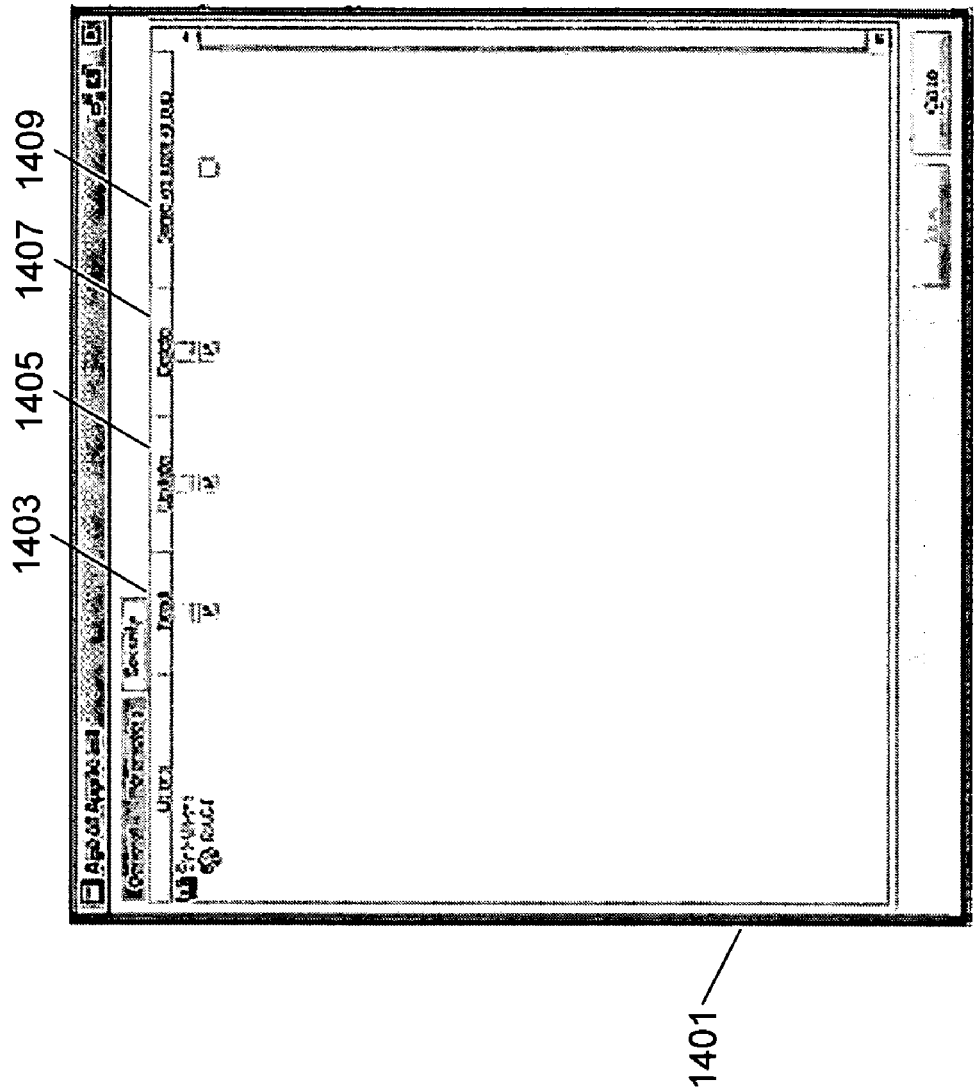
FIG. 14 is a screenshot of Security Panel that enables the designer to specify security details for components like Model, Model Network and Rule.

FIG. 14 shows a screenshot of a Security Panel 1401 that enables the designer to specify security details for components like Model, Model Network and Rule. Security Panel 1401 is shown to the designer when he/she clicks on Security tab 633 of Model Network Details screen 601, Security tab 757 of Model Properties Screen 701, Security tab 945 of Rule screen 901 and Security tab 1123 of DT Properties screen 1101. Security Panel 1401 shows security details of a Model called "Age of Applicant". Security Panel 1401 enables the designer to define security rights of a component. Using Security Panel 1401, security rights may be defined at the user group level and user level. Security Panel 1401 shows a user group named "Sys Users" and a user named "Rage" within the user group "Sys users". Checkboxes corresponding to columns Read 1403, Update 1405 and Delete 1407 enable the designer to respectively provide read, update and delete rights to the user group "Sys Users" and the user "Rage". Read right associated with a component enables a user only to read the particular component, update right enables a user to make changes and update the existing component and delete right enables a user to delete the component. In Security Panel 1401, the rights provided to the user "Rage" are—read, update and delete. In addition to checkboxes under columns Read 1403, Update 1405 and Delete 1407, a checkbox is provided against each user under a column 'Same as user group' 1409. This checkbox enables the designer to directly assign the same security rights to a user as are provided to the corresponding user group.

As discussed earlier, the designer selects icons (like the Model icon, Model Network icon, Rule icon, Decision Tree icon, Assignment Object icon) from Tool Palette 403. The designer selects and drops an icon in Drawing Canvas 402, a flowchart item with cross-hashed lines appears corresponding to the selected icon. After specifying the properties of the flowchart icon in the corresponding properties screen, the cross-hashed lines disappear. Thereafter a double click on the flowchart item brings up the Tasks screen. A Task screen 1501 (shown in FIG. 15) is displayed to the designer when the designer double clicks on a flowchart item corresponding to a Model. Task screen 1501 shown in FIG. 15 corresponds to invoking the Model. The designer specifies a name of the task in a Name block 1503. Name assigned to the task in FIG. 15 is 'Gross Margin'. A Component Type dropdown 1505 is provided which enables a user to specify the component type. Component Type dropdown 1505 has following entries in the dropdown menu—Model, Model Network, Rule and Decision Tree. A Name dropdown 1507 is provided to specify the task to be performed. Entries provided in Name dropdown 1507 depend on the component type selected using Component Type dropdown 1505. For example, when Model component is selected using Component Type dropdown 1505, Name dropdown 1507 displays a list of all Models that have been created.

A Checkbox 1509 is provided to enable the designer to specify if the task is to be executed asynchronously. A Parameters box 1511 enables the designer to define various parameters of the task. In the example task shown in Tasks screen 1501, parameters defined are shown in a table 1513. In table 1513, parameter 'EntityID' is assigned value '[EntityID]' and parameter 'FSDate' is assigned value '[FS_Date]'. A Parameter Details box 1515 allows the designer to specify details for the parameters. The parameters details specified using Parameter Details box 1515 are reflected in table 1513. For example, the procedure of specifying details of a parameter named 'EntityID' is shown in Parameter Details box 1515. The name of the parameter is specified in a Name field 1517. The value for the parameter is specified in a Value box 1519.

As shown, value specified in Value box 1519 is [Entity_ID]. Using a Unit dropdown 1521, the designer specifies unit for the value specified in Value box 1519. A box 1523 allows the designer to select variables, functions and lists to be defined as parameters in Parameter Details box 1515. A Variables tab 1525, a Functions tab 1527 and a Lists tab 1529 are used to select variables, functions and lists respectively. Using an Apply button 1531, the designer applies the parameter details selected. Using a Reset button 1533, the designer resets Parameter Details box 1515 to define the details for other parameters. An OK tab 1535 allows the designer to save the task defined by using Tasks screen 1501. A Cancel tab 1537 allows the designer to cancel the task created by him/her using Tasks screen 1501.

A Model Network created by connecting multiple components and specifying their properties using a visual modeling environment is subsequently verified. The verification of Model Network is also performed using the visual modeling environment provided by Model Network Designer 207. The process of verification of a Model Network is described with reference to FIGS. 16-22.

Figure 16:
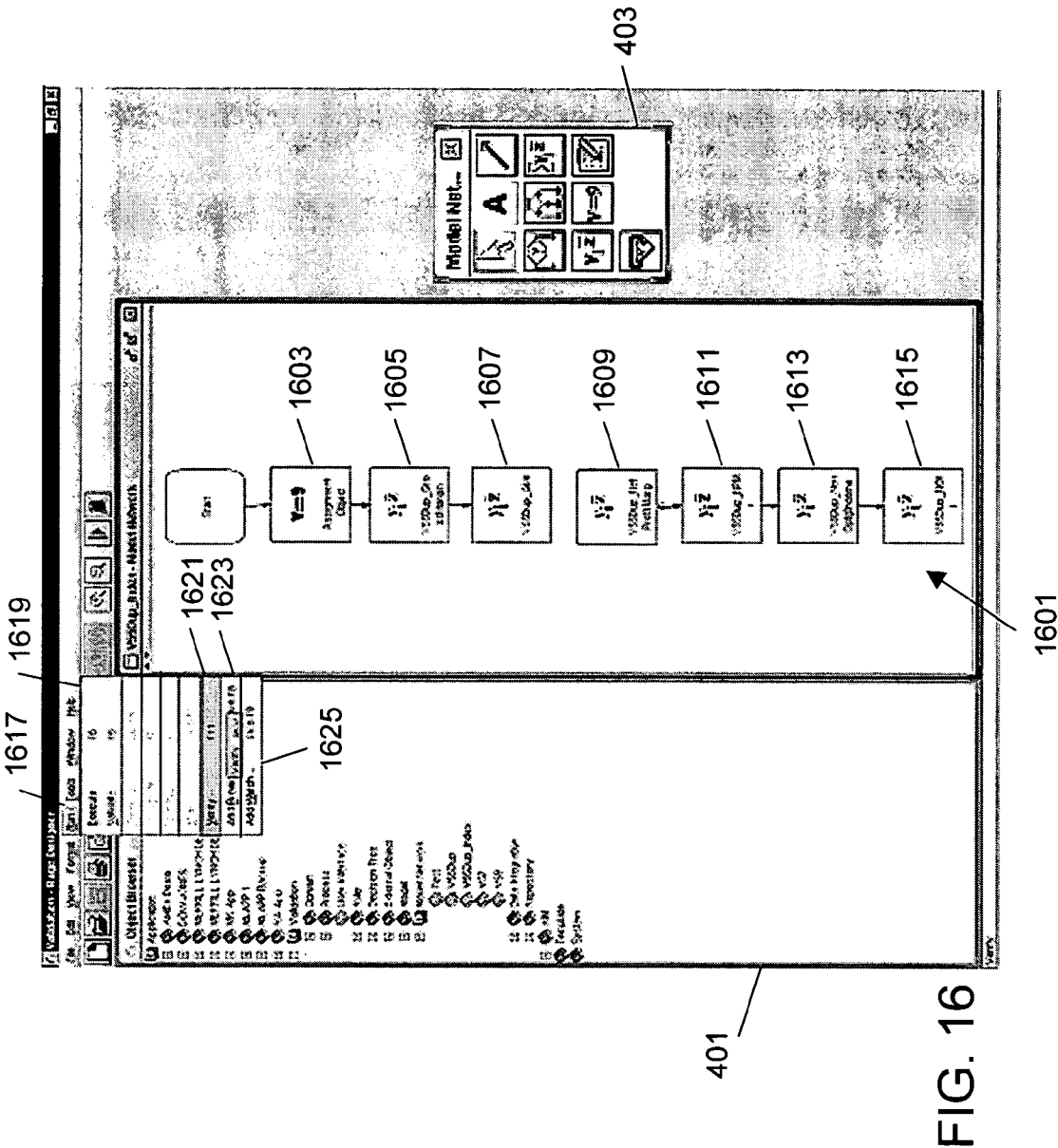
FIG. 16 shows a Model Network screen using which the designer initiates the verification of a Model Network.
Figure 17:
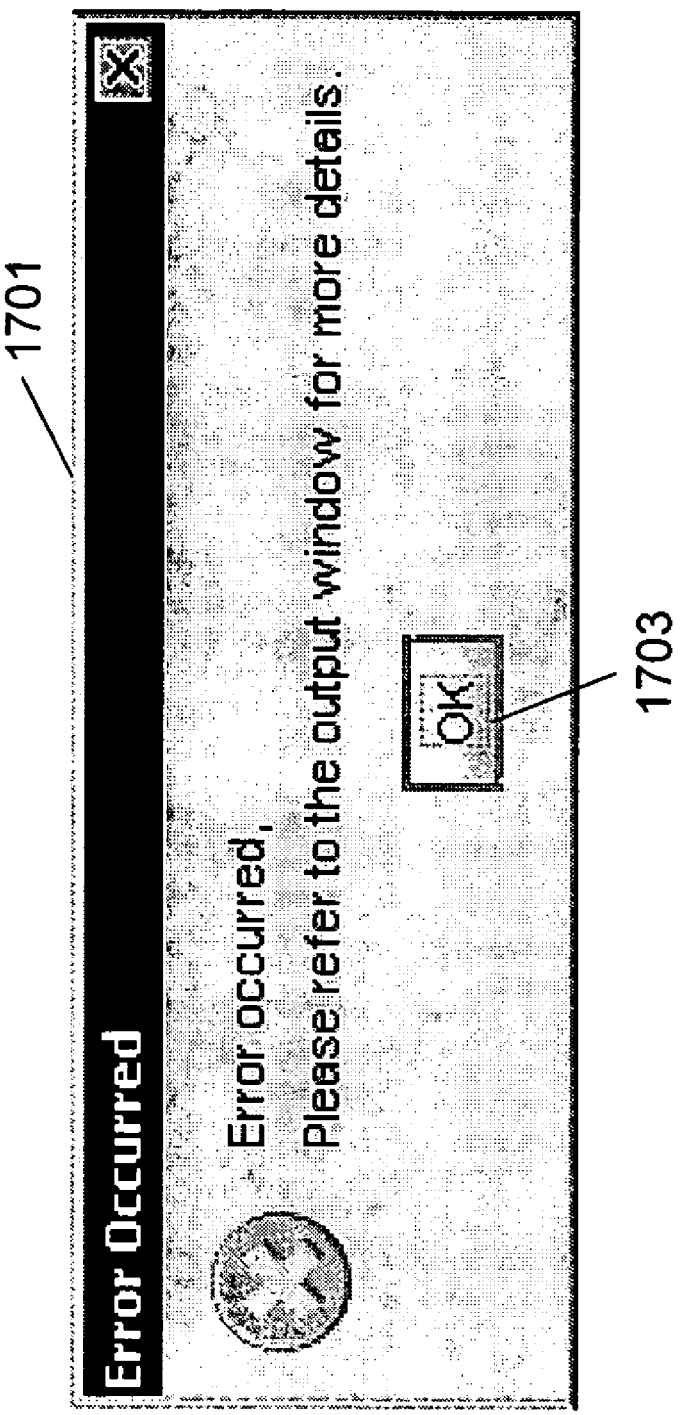
FIG. 17 is a screenshot of an Error message corresponding to an error encountered in verification of a Model Network.

FIG. 16 shows a Model Network screen 401 using which the designer initiates the verification of a Model Network 1601. A Model Network 1601 (named V55Dup_Index) is created using Tool Palette 403. Model Network 1601 consists of a number of tasks (Tasks 1603-1615) connected together. To verify Model Network 1601, the designer clicks on a Run tab 1617. This presents a Dropdown menu 1619 to the designer. Dropdown menu 1619 comprises a Verify option 1621, an Add Breakpoint option 1623 and an Add Watch option 1625. To verify Model Network 1601, the designer chooses Verify option 1621. Model Network Designer 207 verifies Model Network 1601 for errors. In case there are no errors present in Model Network 1601, a message is displayed to the designer that there are no errors present in Model Network 1601. In case Model Network Designer 207 encounters a problem while verifying Model Network 1601 an error message is presented to the designer. FIG. 17 is a screenshot of an Error message 1701. Error message 1701 refers to an Output window that presents the details of the error identified in Model Network 1601. Once the designer clicks on OK tab 1703, the Output window is presented to the designer.

Figure 18:
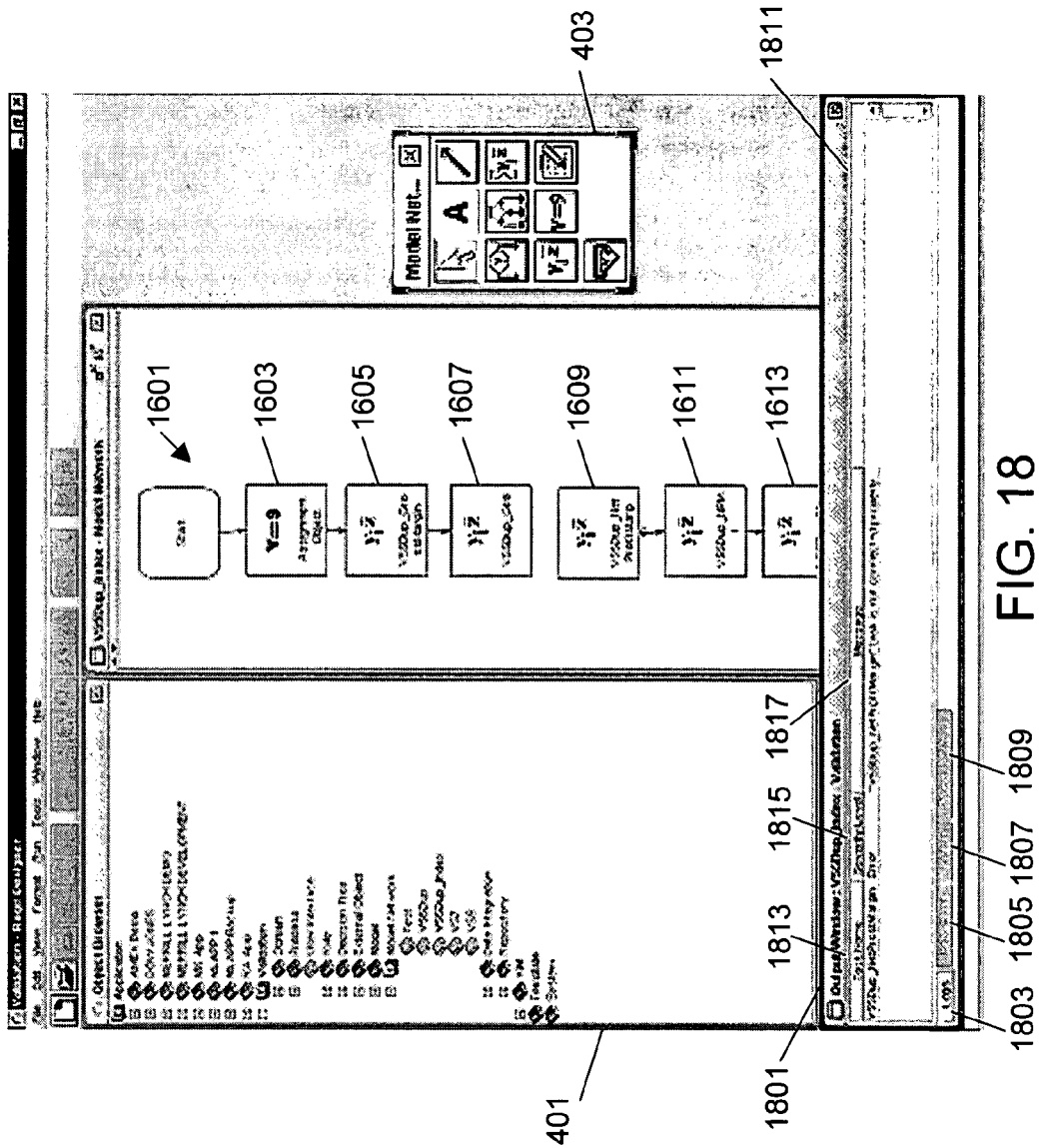
FIG. 18 represents an Output window along with the Model Network screen used to present the results of verification of a Model Network under a Logs tab.

FIG. 18 represents an Output window 1801 along with Model Network screen 401. Output window 1801 comprises four tabs—a Logs tab 1803, a Breakpoint tab 1805, a Watch tab 1807 and a Process Status tab 1809. Under Logs tab 1803, Output window 1801 presents the details of the error using an Error Details table 1811. Error Details table 1811 comprises a Task Name column 1813, a Severity Level column 1815 and a Message column 1817. The name of the task in which the error is encountered is presented in Task Name column 1813. For example, say an error in Model Network 1601 is identified in Task 1611, which is called "V55Dup_NetProfitMargin". Thus, Task Name column 1813 has an entry of "V55Dup_NetProfitMargin". In Severity Level column 1815, the severity level of the error is presented. Severity level of an error can be—Fatal, Error, Warning, Informational and Debug. In Message column 1817, the exact cause of the error is presented to the designer. For example, say the error identified in Model Network 1601 is that Task 1609 (V55Dup_NetProfitMargin) is not properly connected. In this case, "V55Dup_NetProfitMargin task is not connected properly" is presented to the designer using Message column 1817.

Figure 19:
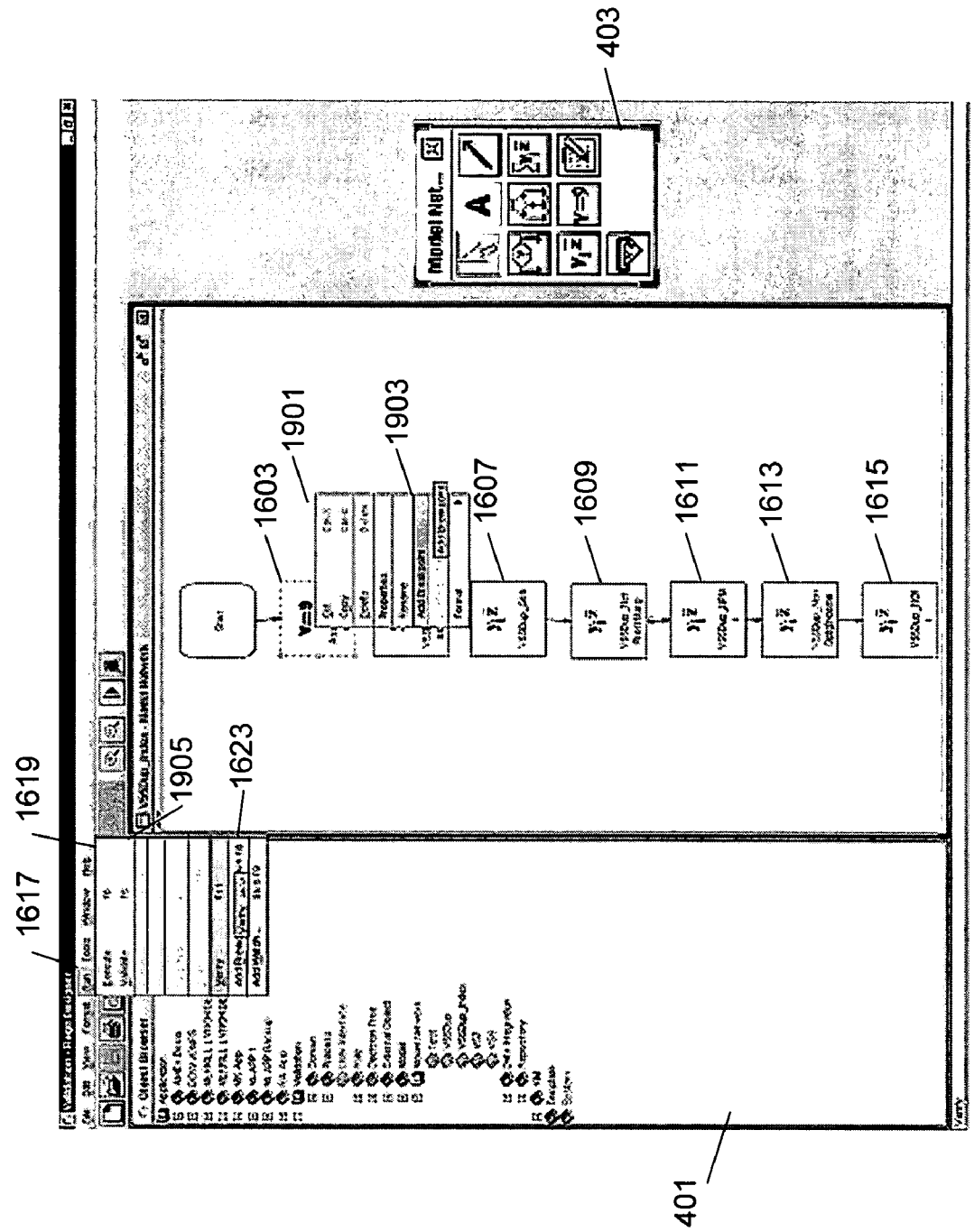
FIG. 19 is Model Network screen that enables the designer to add breakpoint(s) in a Model Network.
Figure 20:
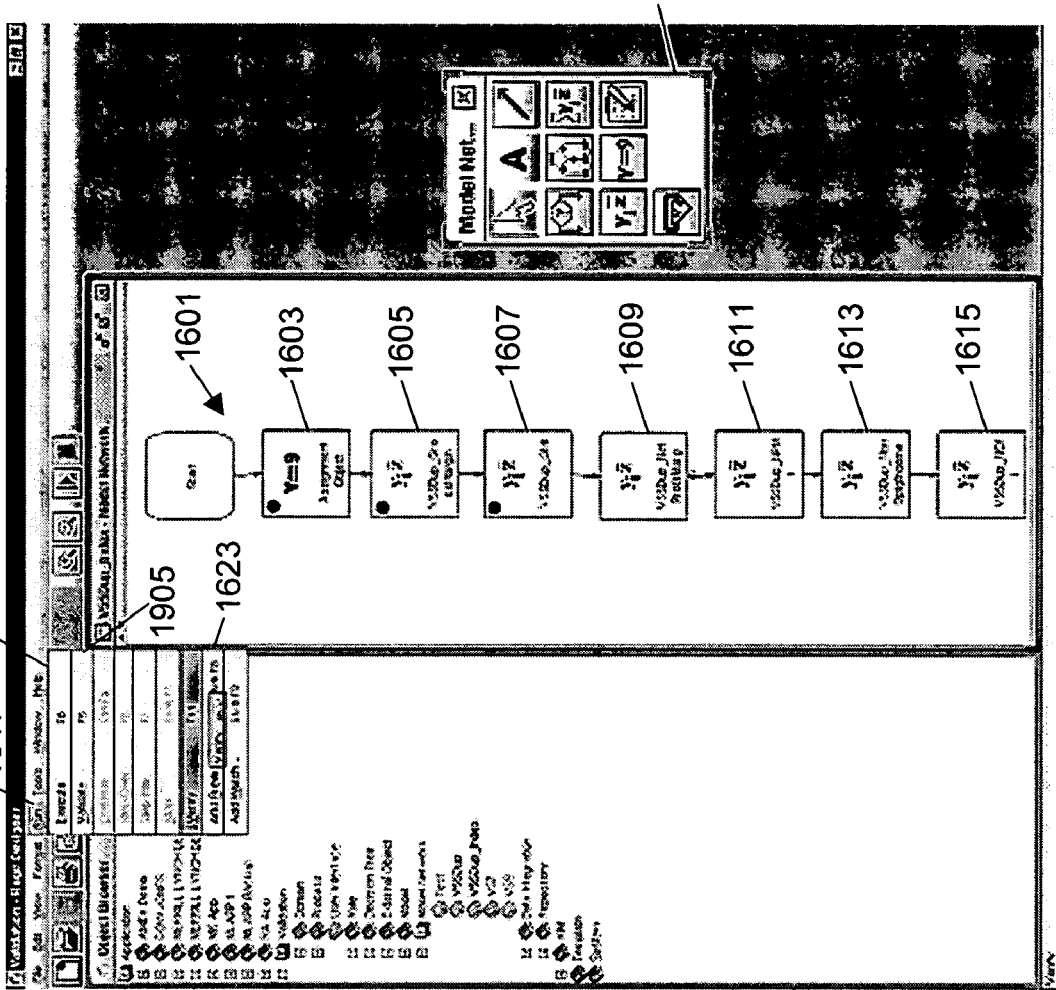
FIG. 20 is a Model Network screen presenting breakpoints added to debug a Model Network.

FIG. 19 is Model Network screen 401 using which the designer adds breakpoint(s) in Model Network 1601 as Model Network 1601 runs in Debug mode. Consider a case where the designer wants to add a breakpoint at Task 1603. The designer right clicks on Task 1603. A right click results in a Pop-up Menu 1901. The designer clicks on an Add Breakpoint option 1903. Thus, a breakpoint is added at Task 1603. The designer can also add a breakpoint by selecting a task and then adding the breakpoint using Add Breakpoint option 1623 provided in Dropdown menu 1619. FIG. 20 is Model Network screen 401 where the designer has added breakpoints at Task 1603, Task 1605 and Task 1607 to debug Model Network 1601. After adding the breakpoints in Model network 1601, the designer clicks on a Validate option 1905 provided in Dropdown menu 1619. Model Network 1601 is validated and the validation stops at the first breakpoint, i.e. at Task 1603. The result of the validation is presented to the designer using Output window 1801.

Figure 21:
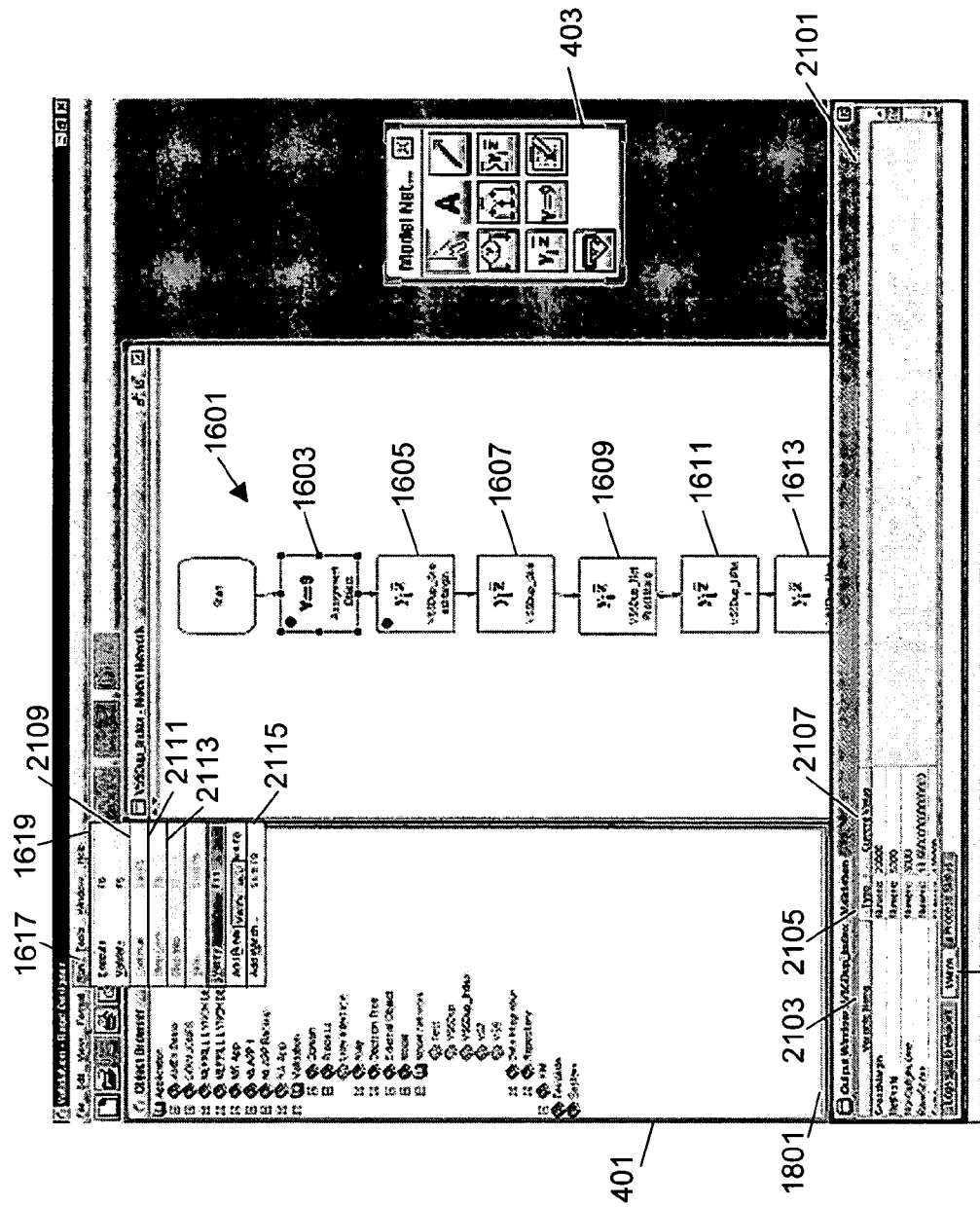
FIG. 21 represents an Output window, along with Model Network screen, presenting the results of validation of a Model Network under a Watch tab.

FIG. 21 represents an Output window 1801 along with Model Network screen 401. Output window 1801 represents the results of validation of Model Network 1601. The results of validation are provided under Watch tab 1807. The results of validation include the variables that are used in the validated tasks and their current values. The validation results are presented using a Validation Results table 2101. Validation Results table 2101 comprises three columns—a Variable Name column 2103, a Type column 2105 and a Current Value column 2107. Variable Name column 2103 lists out the variables that are used in the tasks that are validated in Model Network 1601. Against each variable, the type of the variable is specified in Type column 2105. For example, variable GrossMargin is Numeric type. The current value of the variables is presented in Current Value column 2107. For example, current value of variable GrossMargin is 20000. Once Model Network 1601 is validated till the first breakpoint, the designer can choose one of the three options to validate the remaining part of Model Network 1601. These options are provided in Dropdown menu 1619. These options are—a Continue option 2109, a Step Over option 2111 and a Step Into option 2113. In case the designer clicks on Continue option 2109, the breakpoints applied are ignored and the remaining Model Network 1601 is executed. The results of the execution are provided to the designer using Output window 1801. In case the designer clicks on Step Over option 2111, Model Network 1601 is validated until the next breakpoint and the validation results are provided to the designer. In case the designer clicks on Step Into option 2113, Model Network 1601 is validated task by task. The results of validation of each task are presented to the designer using Output Window 1801.

Figure 22:
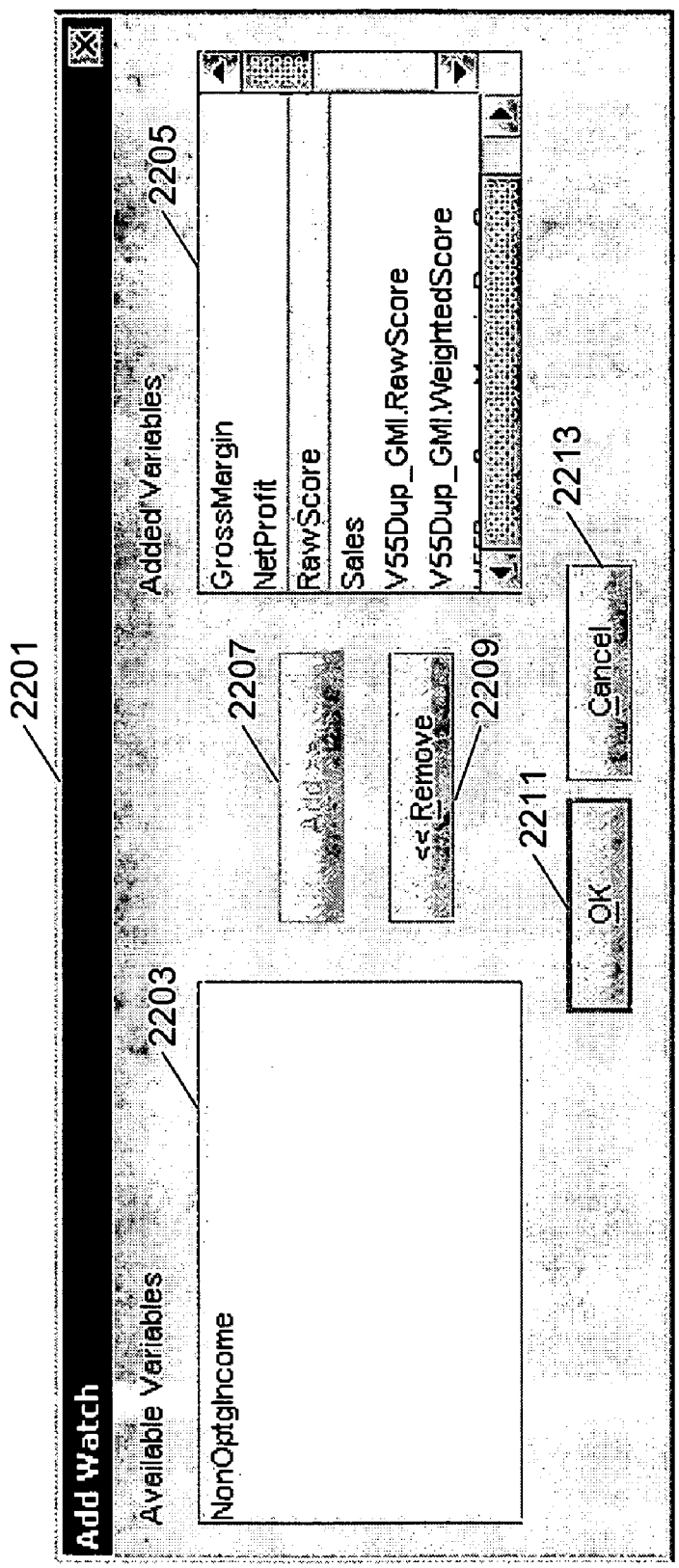
FIG. 22 is a screenshot of an Add Watch window that enables the designer to specify the variables to be watched for in the verification of a Model Network.

As already discussed, the results of validation include details of the variables that are used in the validated Model Network. Here, details of only those variables are presented in Validation Results table 2101 that are specified by the designer for presentation. Also, only these variables are watched for validating the Model Network. The designer specifies these variables using an Add Watch option 2115. When the designer clicks on Add Watch option 2115, an Add Watch window is presented to the designer. FIG. 22 is a screenshot of an Add Watch window 2201. The designer specifies the variables to be watched for in Model Network 1601 using Add Watch window 2201. Add Watch window 2201 comprises an Available Variables field 2203 and an Added variables field 2205. Available variables field 2203 lists all the variables that are used in Model Network 1601. Added Variables field 2205 lists all the variables that are to be watched for Model Network 1601 validation. To add a variable in Added Variables field 2205, the designer selects a variable from Available Variables field 2203 and clicks on an Add button 2207. The selected variable is then added to Added Variables field 2205 and removed from Available Variables field 2203. To remove a variable from Added Variables field 2205, the designer selects a variable from Added Variables field 2205 and clicks on a Remove button 2209. The selected variable is then removed from Added Variables field 2205. After adding all the variables required to be watched for in Added Variables field 2205, the user clicks on an OK tab 2211 to save the changes made. In case the designer wants to discard the changes made regarding adding/removing variables in Added Variables field 2205, he/she clicks on Cancel tab 2213. The variables specified in Added Variables field 2205 are watched for during the validation of Model Network 1601. Also, details of only these variables are presented to the user as the validation results using Validation Results table 2101 (of FIG. 21).

In accordance with a preferred embodiment of the invention, Model Network Designer 207 and the screens as shown in FIGS. 4-22 are implemented in Java. Java Software Development Kit 1.4.1 (Java SDK 1.4.1) has been used for the implementation. In accordance with a preferred embodiment of the present invention, the method of verification of model networks, described with reference to FIG. 16, is also implemented in Java. Error reporting, as described with reference to FIG. 17 and FIG. 18, is also implemented using Java. While the system in accordance with the present invention has been illustrated to be implemented using Java, the implementation should not be considered limiting to Java only. The system in accordance with the present invention can be implemented using any high-level language such as C, C++ and Java.

While the preferred embodiments of the invention have been illustrated and described, it will be clear that the invention is not limited to these embodiments only. Numerous modifications, changes, variations, substitutions and equivalents will be apparent to those skilled in the art without departing from the spirit and scope of the invention as described in the claims.

What is claimed is:

1. A method for enabling an application designer to develop an application based on computational logic, the application being developed by modeling the computational logic without coding, the computational logic being based on a set of interrelated computational models, each computational model signifying a mathematical expression, the set of interrelated computational models being called as a Model Network, the method comprising the steps of:
   a. defining a Model corresponding to each computational model in the Model Network using a visual modeling environment, the Model being visually defined by selecting a Model component and providing meta-data to the selected Model component, the meta-data being specific to the computational model, the Model component being a reusable and highly abstract object built to perform a specific function in the computational logic;
   b. developing the Model network by connecting one or more Models using the visual modeling environment, the one or more Models being connected logically by using at least one Rule and at least one Decision Tree, the at least one Rule and the at least one Decision Tree being reusable abstract objects;
   c. performing interpretation and execution of a plurality of requests corresponding to the Model Network, the plurality of requests being generated by the application designer while developing and maintaining the Model Network and by a user while using the Model Network, the plurality of requests being executed by identifying the one or more Models corresponding to the Model Network and evaluating the identified Models logically, each of the identified Models being evaluated by computing a mathematical expression of the corresponding identified Model; and
   d. storing the meta-data and information related to the execution of the plurality of requests in a Database.

2. The method according to claim 1, wherein the step of defining the Model further comprises the steps of:
   a. defining the mathematical expression corresponding to the Model;
   b. defining a plurality of locations from which values of variables used in the mathematical expression are extracted; and
   c. defining a plurality of conditions under which the Model will be evaluated in the Model Network.

3. The method according to claim 1, wherein the step of defining the Model further comprises the step of defining a set of ranges for a Raw Score.

4. The method according to claim 1, wherein the Model defined is a new Model.

5. The method according to claim 1, wherein the Model defined is an existing Model defined for an existing Model Network.

6. The method according to claim 1, wherein the at least one Rule is defined to connect the one or more models, the defining the at least one Rule comprises the steps of:
   a. defining a plurality of expressions to be compared under each of the at least one Rule; and
   b. defining a conditional relationship to be checked between the plurality of expressions.

7. The method according to claim 1, wherein the at least one Decision Tree is defined to connect the one or more models, the defining the at least one Decision Tree comprises the steps of:
   a. selecting a plurality of components from a Decision Tree Tool Palette; and
   b. connecting the components to define the Decision Tree.

8. The method according to claim 1, wherein connecting the one or more Models further comprises the step of assigning values to variables used in the Model Network.

9. The method according to claim 1, further including the step of enabling the application designer to visually verify execution of the Model Network, the verification comprising the steps of:
   a. adding a plurality of breakpoints in the Model Network;
   b. validating the Model Network until the first breakpoint;
   c. presenting the results of the verification to the application designer; and
   d. verifying remaining part of the Model Network.

10. The method according to claim 9, wherein the verification is performed until the next breakpoint in the Model Network.

11. The method according to claim 9, wherein the verification is performed for the remaining part of the Model Network ignoring the breakpoints.

12. The method according to claim 9, wherein the verification is performed task by task for the remaining part of the Model Network.

13. The method according to claim 9, wherein the verifying step further comprises the steps of:
   a. specifying a plurality of variables to be watched during the verification; and
   b. presenting details of the plurality of variables during the verification.

14. A method for enabling an application designer to develop an application based on computational logic, the application being developed by modeling the computational logic without coding, the computational logic being based on a set of interrelated computational models, each computational model signifying a mathematical expression, the set of interrelated computational models being called as a Model Network, the method comprising:

a. defining a Model corresponding to each computational model in the Model Network using a visual modeling environment, the Model being visually defined by selecting a Model component and providing meta-data to the selected Model component, the meta-data being specific to the computational model, the Model component being a reusable and highly abstract object built to perform a specific function in the computational logic, the defining the Model comprises the steps of:
  i. defining the mathematical expression corresponding to the Model;
  ii. defining a plurality of locations from which values of variables used in the mathematical expression are extracted; and
  iii. defining a plurality of conditions under which the Model will be evaluated in the Model Network;
b. developing the Model network by connecting one or more Models using the visual modeling environment, the one or more Models being connected logically by using at least one Rule and at least one Decision Tree, the at least one Rule and the at least one Decision Tree being reusable abstract objects, wherein the developing the Model Network further comprises the steps of:
  i. defining a plurality of expressions to be compared under each of the at least one Rule;
  ii. defining a conditional relationship to be checked between the plurality of expressions;
  iii. selecting a plurality of components from a Decision Tree Tool Palette; and
  iv. connecting the plurality of components to define the at least one Decision Tree;
c. verifying the Model Network visually;
d. performing interpretation and execution of a plurality of requests corresponding to the Model Network, the plurality of requests being generated by the application designer while developing and maintaining the Model Network and by a user while using the Model Network, the plurality of requests being executed by identifying the one or more Models corresponding to the Model Network and evaluating the identified Models logically, each of the identified Models being evaluated by computing a mathematical expression of the corresponding identified Model; and
e. storing the meta-data and information related to the execution of the plurality of requests in a Database.

15. A system for enabling an application designer to develop an application based on computational logic, the application being developed by modeling the computational logic without coding, the computational logic being based on a set of interrelated computational models, each computational model signifying a mathematical expression, the set of interrelated computational models being called as a Model Network, the system comprising:

a. Model Network Designer, the Model Network Designer providing a visual modeling environment for:
  i. defining a Model corresponding to each computational model in the Model Network, the Model being visually defined by selecting a Model component and providing meta-data to the selected Model component, the meta-data being specific to the computational model, the Model component being a reusable and highly abstract object built to perform a specific function in the computational logic;
  ii. developing the Model network by connecting the Models logically by using at least one Rule and at least one Decision Tree; and
  iii. verifying the developed Model network visually;
b. a Model Network Engine, the Model Network Engine performing interpretation and execution of a plurality of requests corresponding to the Model Network, the plurality of requests being generated by the application designer while developing and maintaining the Model Network and by a user while using the Model Network, the plurality of requests being executed by identifying the one or more Models corresponding to the Model Network and evaluating the identified Models logically, the Model Network Engine comprising:
  i. an Expression Evaluator for evaluating each of the identified Models by computing a mathematical expression of the corresponding identified Model; and
c. a Database, the Database storing the meta-data and information related to the execution of the plurality of requests.

16. The system according to claim 15 further comprising a plurality of pre-built components, the plurality of pre-built components enabling the application designer to develop the Model Network, each of the plurality of pre-built components representing a functionality that is typically required in development of the Model Network, each of the plurality of pre-built components comprising:

a. a data structure that defines the structure of the meta-data, wherein the meta-data is a collection of properties specific to the functionality being represented by the pre-built component;
b. a plurality of Graphical User Interface (GUI) objects that encapsulate the data structure and provide a GUI to the application designer to input the meta-data; and
c. a computer program code segment that understands the structure and the implied functionality of the pre-built component.

17. The system according to claim 16, wherein the plurality of pre-built components comprises Functional components, the Functional components comprising:

a. a Model component representing a functionality of evaluation of a mathematical expression;
b. a Model Network component representing a functionality of evaluation of a network of the Models;
c. a Rule component representing a functionality of evaluation of a condition;
d. a Decision Tree component representing a functionality of evaluation of a sequence of conditions; and
e. an Assignment Object representing a functionality of assigning a value to variables used in the Model Network.

18. The system according to claim 16, wherein the plurality of pre-built components further comprises Flow components, the Flow components comprising:

a. a Selector component representing a functionality of selecting one of the pre-built components in the Model Network;
b. a Text component representing a functionality of annotation;
c. a Line component representing a functionality of connecting the pre-built components;

d. a Task component representing a functionality of calling the Rule component, the Decision Tree component, the Model component and the Model Network component; and e. a Message Task component representing a functionality of sending a Simple Mail Transfer Component (SMTP) compliant mail message and logging a user defined message in a log file.

19. The system according to claim 15, wherein the Model Network Designer comprises:

a. a Model Network screen for defining the Model Network;

b. a Model Network Details screen for specifying properties of the Model Network;

c. a Model Properties screen for defining the Model;

d. a Range window for defining range for an output of the Model;

e. a Rule screen for defining the at least one Rule;

f. an Assignment Object screen for defining an Assignment Object;

g. a Decision Tree screen for defining the at least one Decision Tree;

h. a Decision Tree Details screen for specifying properties of the at least one Decision Tree;

i. a Parameter Panel for specifying parameter details for functional components;

j. a Security Panel for specifying security details of Functional components;

k. a Task screen for specifying details of tasks corresponding to the Functional components used in the Model Network;

l. an Output window for presenting results of verification of the Model Network to the application designer; and m. an Add Watch window to add and remove variables to be watched for in the Model Network.

20. The system according to claim 19, wherein the Model Network screen comprises:

a. a Drawing Canvas for visually representing the Model Network; and b. a Tool palette for providing interface to the plurality of pre-built components for defining the Model Network.

21. The system according to claim 19, wherein the Decision Tree screen comprises:

a. a Drawing Canvas for visually representing the Decision Tree; and b. a Decision Tree Tool Palette for providing interface to the components for defining the Decision Tree.

22. A computer program product for use with a computer, the computer program product comprising a computer usable medium having a computer readable program code embodied therein for enabling an application designer to develop an application based on computational logic, the application being developed by modeling the computational logic without coding, the computational logic being based on a set of interrelated computational models, each computational model signifying a mathematical expression, the set of interrelated computational models being called as a Model Network, the computer program code performing the steps of:

a. defining a Model corresponding to each computational model in the Model Network using a visual modeling environment, the Model being visually defined by selecting a Model component and providing meta-data to the selected Model component, the meta-data being specific to the computational model, the Model component being a reusable and highly abstract object built to perform a specific function in the computational logic;

b. developing the Model network by connecting one or more Models using the visual modeling environment, the one or more Models being connected logically by using at least one Rule and at least one Decision Tree, the at least one Rule and the at least one Decision Tree being reusable abstract objects;

c. performing interpretation and execution of a plurality of requests corresponding to the Model Network, the plurality of requests being generated by the application designer while developing and maintaining the Model Network and by a user while using the Model Network, the plurality of requests being executed by identifying the one or more Models corresponding to the Model Network and evaluating the identified Models logically, each of the identified Models being evaluated by computing a mathematical expression of the corresponding identified Model; and d. storing the meta-data and information related to the execution of the plurality of requests in a Database.

23. The computer program product as claimed in claim 22, the computer program product further comprising program code embodied therein for enabling a user to visually verify the Model Network developed.

* * * * *